US009463968B2

(12) United States Patent
Schaefer et al.

(10) Patent No.: US 9,463,968 B2
(45) Date of Patent: Oct. 11, 2016

(54) FAUCET ASSEMBLY

(71) Applicant: Brewnique LLC, Chesterfield, MO (US)

(72) Inventors: Mark Schaefer, Chesterfield, MO (US); Patrick Morrissey, Ballwin, MO (US); Sesha Chalapathi Madireddi, St. Charles, MO (US); Ye Tian, Maryland Heights, MO (US); Nicholas William Yurek, St. Louis, MO (US)

(73) Assignee: Brewnique LLC, Chesterfield, MO (US)

( * ) Notice: Subject to any disclaimer, the term of this patent is extended or adjusted under 35 U.S.C. 154(b) by 158 days.

(21) Appl. No.: 14/056,338

(22) Filed: Oct. 17, 2013

(65) Prior Publication Data

US 2014/0102570 A1 Apr. 17, 2014

Related U.S. Application Data

(60) Provisional application No. 61/751,469, filed on Jan. 11, 2013, provisional application No. 61/715,112, filed on Oct. 17, 2012.

(51) Int. Cl.
*F16K 7/04* (2006.01)
*B67D 3/00* (2006.01)
*B67D 3/04* (2006.01)

(52) U.S. Cl.
CPC ............. *B67D 3/0058* (2013.01); *B67D 3/041* (2013.01); *Y10T 137/9464* (2015.04)

(58) Field of Classification Search
CPC .......... Y10T 137/9464; B67D 3/0058; B67D 3/041
USPC ......... 222/511, 518; 251/4, 7, 9; 292/17, 74, 292/76; 285/82
See application file for complete search history.

(56) References Cited

U.S. PATENT DOCUMENTS 114,981 A * 5/1871 Shoenberger ..................... 251/4
151,166 A 5/1874 Shaw
261,354 A * 7/1882 Johnson ............................ 251/9
(Continued)

FOREIGN PATENT DOCUMENTS

DE 1532637 3/1970
DE 8622878 11/1986
DE 9313842 11/1993

OTHER PUBLICATIONS

PCT/US2013/065409 International Search Report and Written Opinion date Mar. 7, 2014 (13 pages).

*Primary Examiner* — Marina Tietjen
*Assistant Examiner* — Umashankar Venkatesan
(74) *Attorney, Agent, or Firm* — Michael Best & Friedrich LLP

(57) ABSTRACT

A faucet assembly for dispensing liquid from a beverage source includes a housing having a body and a cover coupled to the body. The body is configured to mount to a structure associated with the beverage source. The cover is movable relative to the body while the body is connected to the structure to provide access to an interior of the housing. The faucet assembly also includes an insert positioned within the housing in fluid communication with the beverage source to direct the liquid through the housing. The insert is removable from the housing when the cover is moved to provide access to the interior of the housing. The faucet assembly further includes an actuator supported by the housing. The actuator is movable relative to the housing to selectively inhibit fluid flow through the insert.

19 Claims, 28 Drawing Sheets

(56) References Cited

U.S. PATENT DOCUMENTS

| | | | | |
|---|---|---|---|---|
| 749,338 | A | | 1/1904 | Taylor |
| 1,978,774 | A | | 10/1934 | Voss et al. |
| 2,549,207 | A | | 4/1951 | Kestenbaum |
| 2,660,395 | A | | 11/1953 | Mair et al. |
| 2,930,408 | A | | 3/1960 | Stevens |
| 3,100,102 | A | * | 8/1963 | De Haan ........................... 251/9 |
| 3,583,736 | A | * | 6/1971 | Willimzik ....................... 292/16 |
| 3,583,737 | A | * | 6/1971 | Tutikawa ........................ 292/16 |
| 3,598,156 | A | | 8/1971 | Ulmer et al. |
| 3,753,582 | A | * | 8/1973 | Graham ........................ 285/305 |
| 3,861,421 | A | | 1/1975 | Thompson |
| 3,891,530 | A | | 6/1975 | Alewitz |
| 3,900,136 | A | | 8/1975 | Paranto |
| 4,044,989 | A | | 8/1977 | Basel et al. |
| 4,526,730 | A | | 7/1985 | Cochran et al. |
| 4,679,294 | A | | 7/1987 | Lomax et al. |
| 4,708,155 | A | | 11/1987 | Austin et al. |
| 5,022,565 | A | | 6/1991 | Sturman et al. |
| 5,105,854 | A | | 4/1992 | Cole et al. |
| 5,110,012 | A | | 5/1992 | Scholle et al. |
| D351,015 | S | | 9/1994 | Caceres et al. |
| 5,352,214 | A | | 10/1994 | Oscarsson |
| 5,395,012 | A | | 3/1995 | Grill et al. |
| 5,402,823 | A | | 4/1995 | Cole |
| 5,429,615 | A | | 7/1995 | Starchevich |
| 5,443,186 | A | | 8/1995 | Grill |
| 5,755,527 | A | | 5/1998 | Dufresne |
| 5,979,713 | A | | 11/1999 | Grill |
| D419,860 | S | | 2/2000 | Persson |
| 6,041,970 | A | | 3/2000 | Vogel |
| D441,050 | S | | 4/2001 | Burns et al. |
| 6,263,903 | B1 | | 7/2001 | Sjoberg |
| 6,361,016 | B1 | | 3/2002 | Schulz |
| D459,434 | S | | 6/2002 | Fauquet |
| D459,435 | S | | 6/2002 | Fauquet |
| 6,598,768 | B2 | | 7/2003 | Celli |
| 6,820,856 | B2 | | 11/2004 | Grill |
| 7,021,052 | B1 | | 4/2006 | Hicks |
| 7,032,781 | B2 | | 4/2006 | Van Der Klaauw et al. |
| 7,178,699 | B2 | * | 2/2007 | Spray et al. .................. 222/212 |
| 7,188,751 | B2 | | 3/2007 | Van Der Klaauw et al. |
| 7,472,882 | B2 | | 1/2009 | Spray et al. |
| 7,621,570 | B2 | | 11/2009 | Hashem |
| 7,641,170 | B2 | | 1/2010 | Spray et al. |
| 7,806,299 | B2 | | 10/2010 | Wauters et al. |
| 8,002,148 | B2 | | 8/2011 | Pakkert et al. |
| 8,047,236 | B2 | | 11/2011 | Perry |
| 8,079,496 | B2 | | 12/2011 | Pakkert et al. |
| 8,439,084 | B2 | | 5/2013 | Perry |
| D699,822 | S | | 2/2014 | Beaudoin |
| D707,334 | S | | 6/2014 | Hernandez et al. |
| D709,994 | S | | 7/2014 | King et al. |
| 2010/0147901 | A1 | * | 6/2010 | Larsson et al. ............... 222/526 |
| 2010/0244432 | A1 | | 9/2010 | Neame et al. |
| 2012/0018654 | A1 | | 1/2012 | Wennberg et al. |
| 2012/0152396 | A1 | | 6/2012 | Friedrich et al. |
| 2012/0204992 | A1 | | 8/2012 | Park et al. |
| 2012/0248139 | A1 | * | 10/2012 | Haskayne ............ B67D 1/1411 222/1 |
| 2013/0061973 | A1 | | 3/2013 | Zerbes et al. |

* cited by examiner

FAUCET ASSEMBLY

CROSS-REFERENCE TO RELATED APPLICATIONS

This application claims priority to U.S. Provisional Patent Application No. 61/715,112, filed Oct. 17, 2012, and to U.S. Provisional Patent Application No. 61/751,469, filed Jan. 11, 2013, the entire contents of both of which are incorporated by reference herein.

BACKGROUND

The present invention relates to faucet assemblies for dispensing beverages.

Faucets are commonly used to tap and dispense beverages that are stored in pressurized containers or pipe lines. These faucets, however, need to be cleaned at regular intervals to maintain suitable sanitary conditions. Typically, cleaning a faucet involves taking the faucet off of a beverage source, disassembling a handle or actuator from the faucet, taking the faucet apart, cleaning individual components of the faucet by soaking the components in solution and brushing the components, reassembling the faucet, and reinstalling the faucet on the beverage source. This process is very time-consuming for a user.

SUMMARY

In one embodiment, the invention provides a faucet assembly for dispensing liquid from a beverage source. The faucet assembly includes a housing having a body and a cover coupled to the body. The body is configured to mount to a structure associated with the beverage source. The cover is movable relative to the body while the body is connected to the structure to provide access to an interior of the housing. The faucet assembly also includes an insert positioned within the housing in fluid communication with the beverage source to direct the liquid through the housing. The insert is removable from the housing when the cover is moved to provide access to the interior of the housing. The faucet assembly further includes an actuator supported by the housing. The actuator is movable relative to the housing to selectively inhibit fluid flow through the insert.

In another embodiment, the invention provides a faucet assembly for dispensing liquid from a beverage source. The faucet assembly includes a housing configured to mount to a structure associated with the beverage source, a flexible tube positioned within the housing in fluid communication with the beverage source to direct the liquid through the housing, and an actuator supported by the housing. The actuator includes a handle pivotally coupled to the housing, and a valve member positioned within the housing and coupled to the handle for movement with the handle. The valve member is movable linearly relative to the housing between a first position, in which fluid flow is substantially uninterrupted through the flexible tube, and a second position, in which the flexible tube is pinched closed. The actuator also includes a biasing member coupled to the valve member to bias the valve member toward the second position.

In yet another embodiment, the invention provides a faucet assembly for dispensing liquid from a beverage source. The faucet assembly includes a housing having a body and a cover coupled to the body. The body is configured to mount to a structure associated with the beverage source. The cover is movable relative to the body while the body is connected to the structure to provide access to an interior of the housing. The faucet assembly also includes an insert positioned within the housing in fluid communication with the beverage source to direct the liquid through the housing. The insert includes a flexible tube and a connector that is releasably secured to the body adjacent an inlet end of the housing. The insert is removable from the housing when the cover is moved to provide access to the interior of the housing. The faucet assembly further includes an actuator supported by the housing. The actuator includes a handle pivotally coupled to the housing. The handle includes a cam. The actuator also includes a valve member positioned within the housing and coupled to the handle for movement with the handle. The valve member is movable linearly relative to the housing between a first position, in which fluid flow is substantially uninterrupted through the flexible tube, and a second position, in which the flexible tube is pinched close. The actuator further includes a biasing member coupled to the valve member to bias the valve member toward the second position. The cam engages a surface of the housing as the handle is pivoted so that the handle pulls the valve member away from the flexible tube against a bias of the biasing member.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

FIGS. 1-4 illustrate a faucet assembly 10 for dispensing liquid from a beverage source, such as a pressurized container or pipe line. In some scenarios, the faucet assembly 10 may be used in a restaurant or bar to dispense beverages (e.g., beer, soda, water, juice, slush, etc.) suitable for consumption by a consumer or patron. In such scenarios, the faucet assembly 10 may be mounted on, for example, a beer tower or column supported by a wall, cabinet, or counter within the restaurant or bar. Alternatively, the faucet assembly may be mounted on other suitable structures associated with the beverage source. In other embodiments, the faucet assembly may be configured to dispense other types of liquids or fluids from a fluid source.

Figure 1:
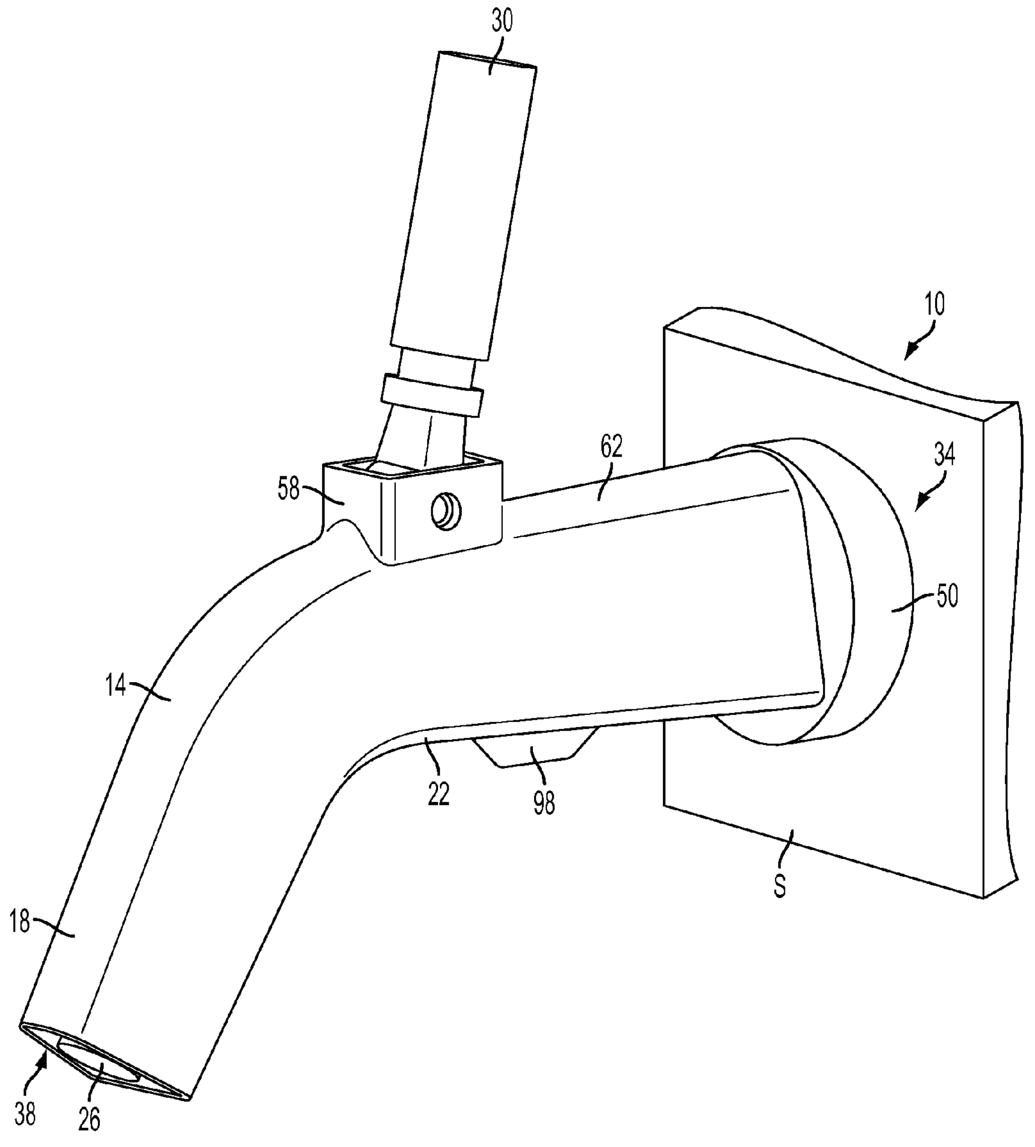
FIG. 1 is a perspective view of a faucet assembly embodying the invention.
Figure 2:
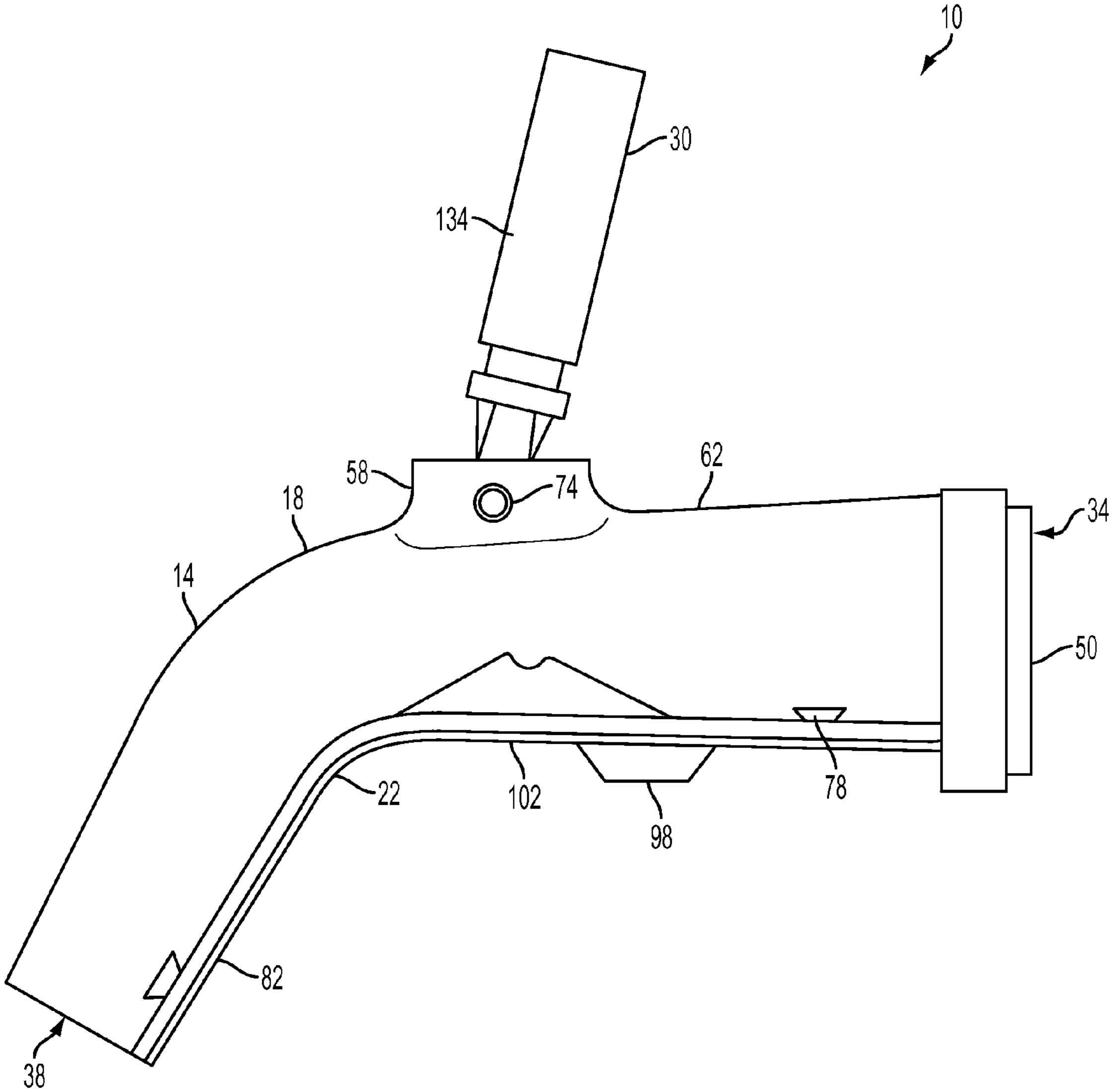
FIG. 2 is a side view of the faucet assembly of FIG. 1.
Figure 3:
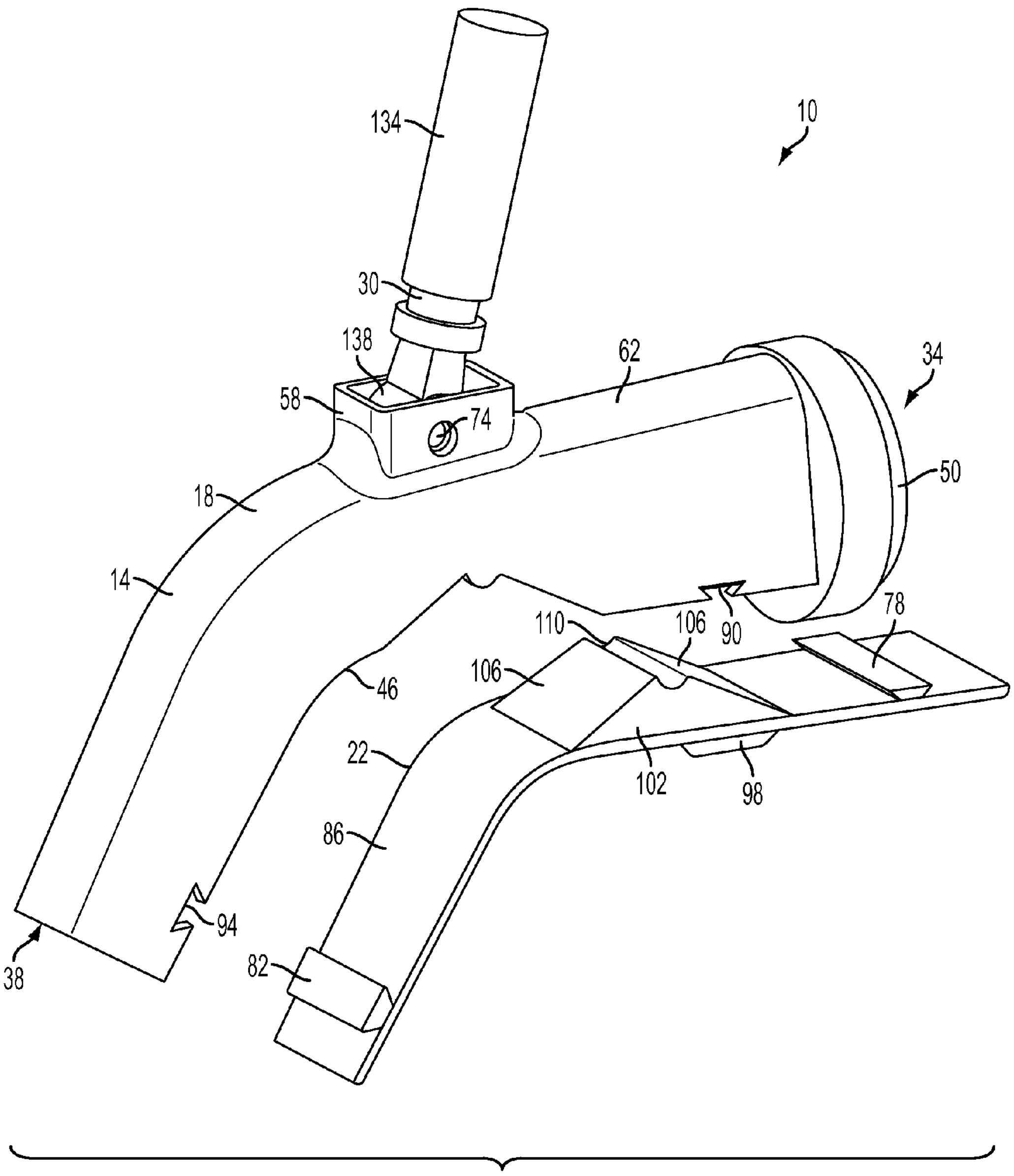
FIG. 3 is a perspective view of the faucet assembly of FIG. 1, the faucet assembly including a lower cover detached from an outer body.
Figure 4:
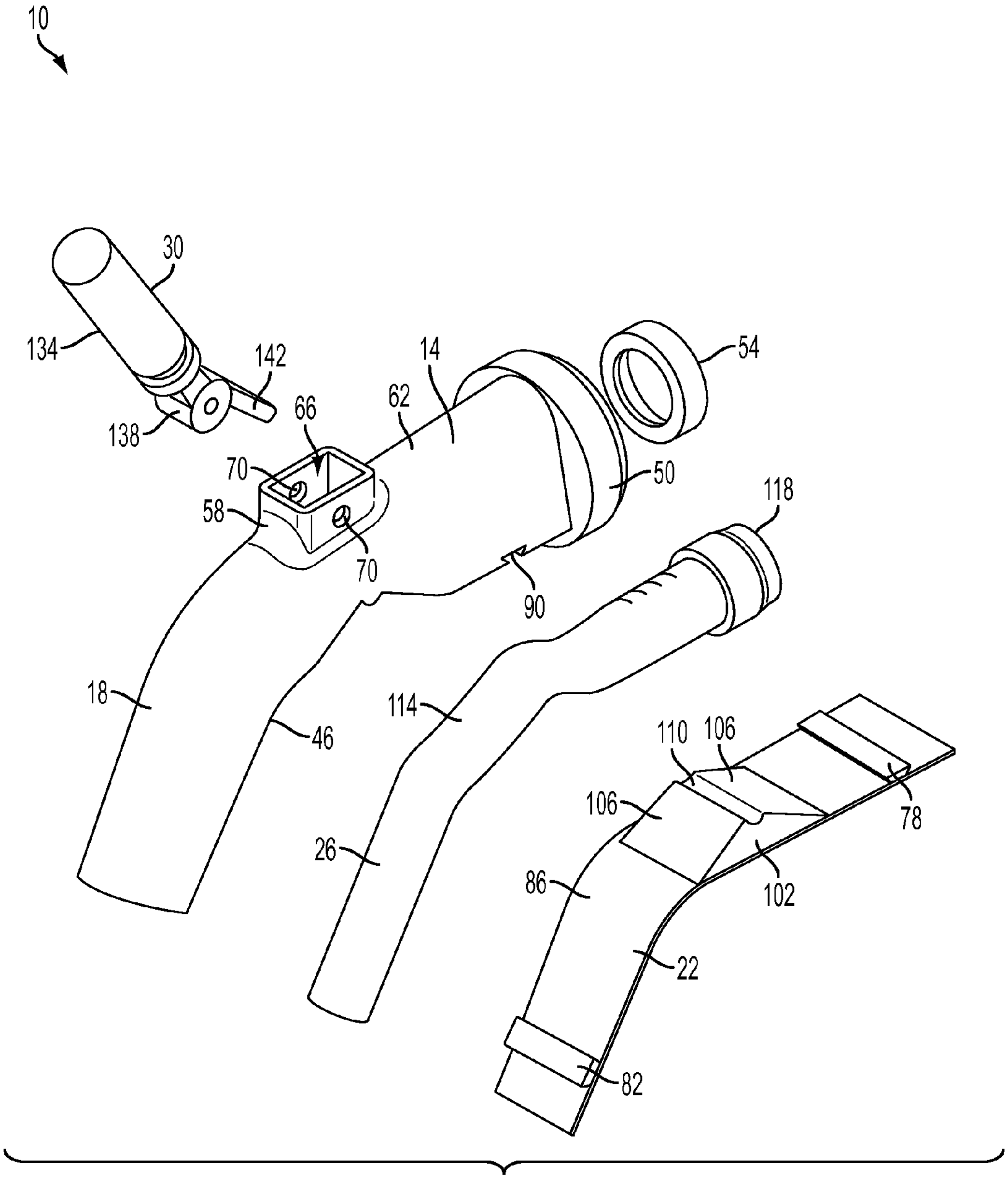
FIG. 4 is an exploded perspective view of the faucet assembly of FIG. 1.

The faucet assembly 10 includes a housing 14 having an outer body 18 and a detachable cover 22, a replaceable insert 26 positioned within the housing 14, and an actuator 30 pivotally coupled to the housing 14. The illustrated housing 14 is generally L-shaped and formed of metal. As shown in FIGS. 2 and 3, the housing 14 includes an inlet end 34 and an outlet end 38. The inlet end 34 receives liquid (e.g., a beverage) from the beverage source, while the outlet end 38 dispenses the liquid to a user. The housing 14 also defines a passageway 42 (FIGS. 7 and 8) extending through the housing 14 from the inlet end 34 to the outlet end 38. The passageway 42 is configured to receive the insert 26 (FIG. 4) to direct liquid from the liquid source out of the faucet assembly 10. In the illustrated embodiment, the outer body 18 forms an upper portion of the housing 14 and generally defines three sides of the passageway 42. The cover 22 is coupled to the outer body 18 and defines the fourth side of the passageway 42. The illustrated cover 22 is coupled to a lower end 46 of the body 18 to define and enclose the bottom of the passageway 42 and support the insert 26 (FIG. 4). In other embodiments, the cover 22 may be coupled to a different end or side of the body 18 to define another side of the passageway 42.

The outer body 18 includes a connector portion 50 formed at the inlet end 34 of the housing 14. The connector portion 50 is configured to mount the faucet assembly 10 to a structure S associated with and in fluid communication with the beverage source. In some embodiments, the connector portion 50 may be welded, threaded, press-fit, or otherwise secured to the structure S. In the illustrated embodiment, an annular gasket 54 (FIG. 4) is positioned within the connector portion 50. The gasket 54 engages a fluid pipe, line, or conduit extending from the beverage source to help inhibit liquid from contacting any metallic surface of the housing 14 as the liquid enters the faucet assembly 10.

The outer body 18 also includes a mount portion 58. The mount portion 58 is formed on an upper surface 62 of the outer body 18 and pivotally connects the actuator 30 to the housing 14. As shown in FIG. 4, the mount portion 58 defines an upper opening 66 to receive at least a portion of the actuator 30. The mount portion 58 also defines two relatively small side openings 70 that receive a pin 74 to pivotally couple the actuator 30 to the housing 14.

The illustrated cover 22 is detachably coupled to the outer body 18 by two dovetail joints. As shown in FIGS. 3 and 4, the cover 22 includes two dovetail-shaped projections 78, 82 extending from an inner surface 86 of the cover 22. The first projection 78 is positioned adjacent the inlet end 34 of the housing 14, and the second projection 82 is positioned adjacent the outlet end 38 of the housing 14. The projections 78, 82 are received in corresponding dovetail-shaped recesses 90, 94 formed in the lower end 46 of the body 18. These dovetail joints allow the cover 22 to slide laterally relative to the outer body 18 to detach the cover 22 from the body 18, but inhibit the cover 22 from being pulled downwardly away from the body 18. In the illustrated embodiment, the cover 22 also includes a protrusion 98 extending from an outer surface of the cover 22 to facilitate moving the cover 22 relative to the body 18. In some embodiments, the dovetail joints may include detents or catches to further secure the cover 22 to the outer body 18.

The illustrated cover 22 also includes a ramp or projection 102 extending from the inner surface 86 of the cover 22. The ramp 102 includes two inclined surfaces 106 and a recess 110 formed at an apex of the inclined surfaces 106. The ramp 102 cooperates with the actuator 30 to selectively inhibit or restrict fluid flow through the insert 26, as further described below. As shown in FIG. 2, the lower end 46 of the outer body 18 is contoured to provide clearance for the ramp 102 when the cover 22 is slid onto and off of the body 18.

Figure 5:
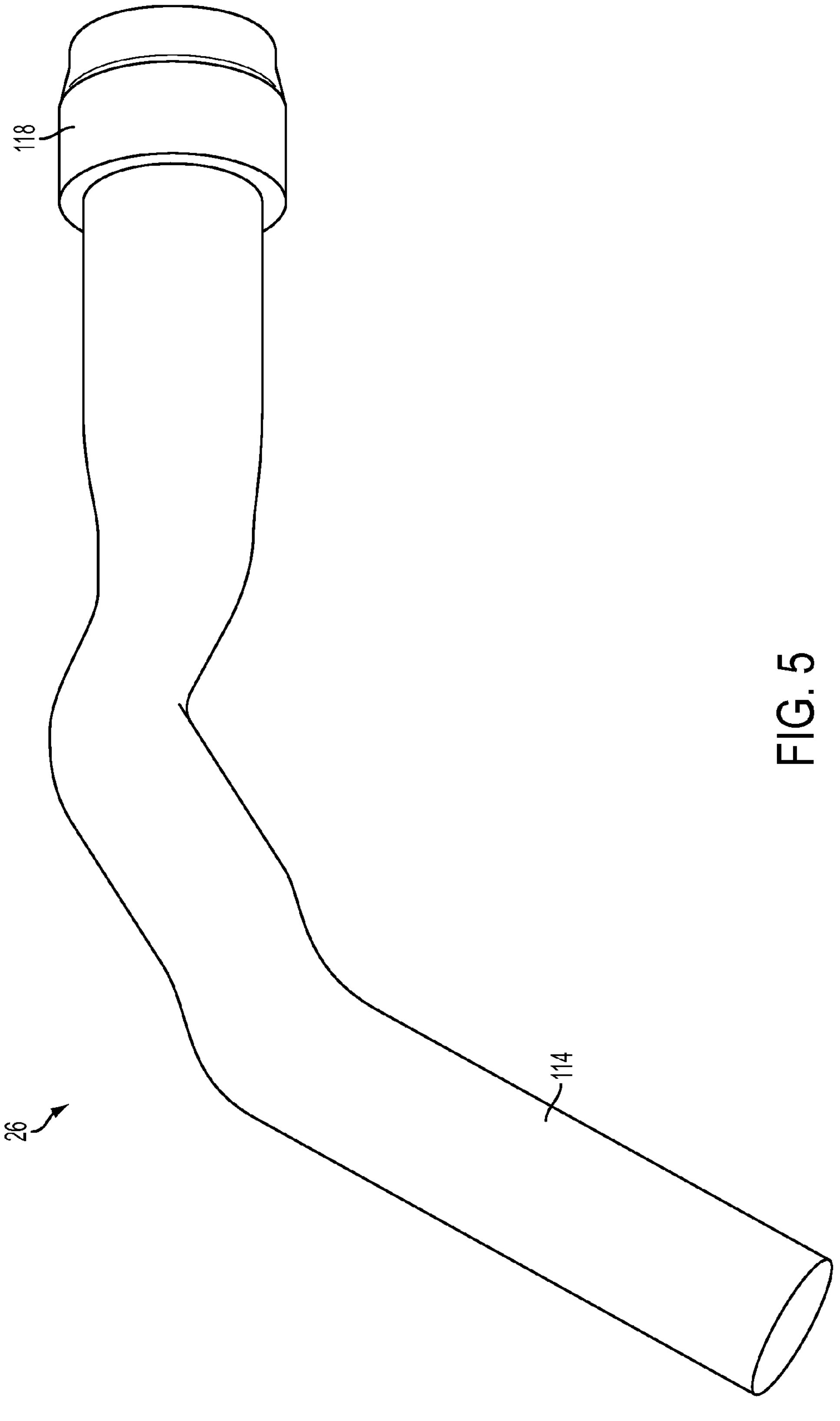
FIG. 5 is a perspective view of a replaceable insert for use with the faucet assembly of FIG. 1.

FIGS. 4 and 5 illustrate the replaceable insert 26 of the faucet assembly 10. The insert 26 includes a bendable or flexible tube 114 and a connector 118. The bendable tube 114 is relatively firm and can have a bend radius of about 1.75 inches. In some embodiments, the tube 114 may be Tygon tubing sold by Saint-Gobain Corporation. In other embodiments, other suitable types of beverage tubing may also or alternatively be employed. The tube 114 has a length that is generally the same as the overall length of the passageway 42 in the housing 14. The tube 114 can thereby direct liquid through the faucet assembly 10 without the liquid ever contacting the housing 14.

Figure 6:
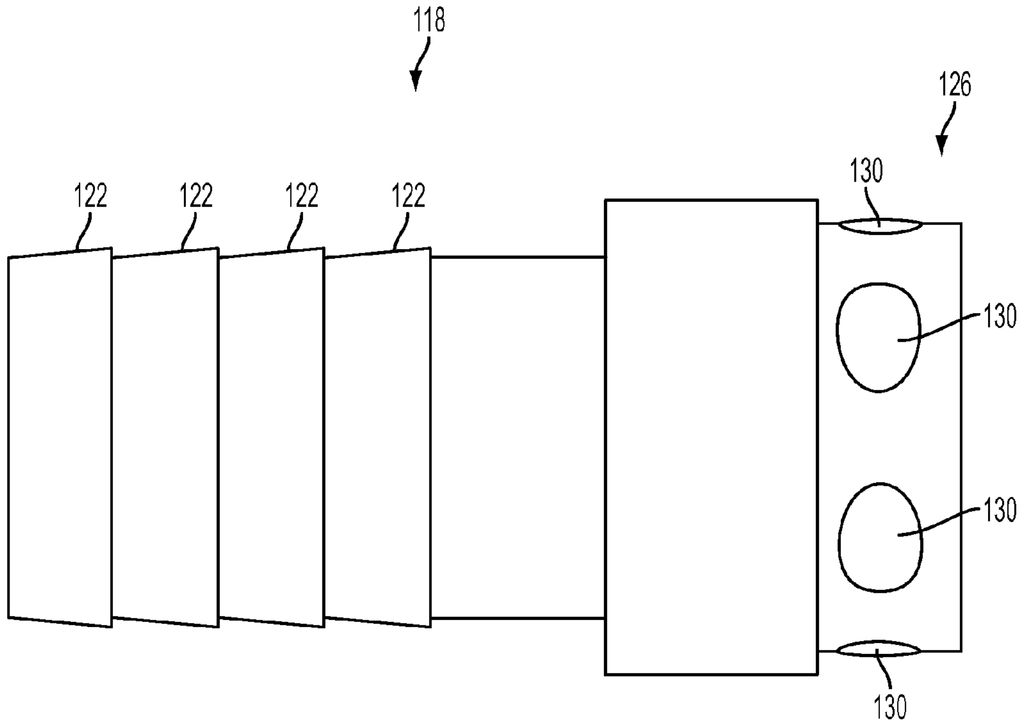
FIG. 6 is a side view of a connector of the replaceable insert of FIG. 5.

The connector 118, or barb nozzle, is coupled to an end of the tube 114 that is positioned adjacent the inlet end 34 of the housing 14. As shown in FIG. 6, the connector 118 includes a series of barbs 122 extending radially outward therefrom. The barbs 122 fit within the tube 114 and engage an inner surface of the tube 114 to secure the tube 114 to the connector 118. In some embodiments, an adhesive may also or alternatively be used between the connector 118 and the tube 114 to secure the tube 114 to the connector 118.

The illustrated connector 118 further includes a locking profile 126 for connecting the insert 26 to the housing 14. In the illustrated embodiment, the locking profile 126 is formed as a plurality of projections 130 spaced circumferentially around the connector 118. The projections 130 align with and engage corresponding structures on the connector portion 50 of the outer body 18 to help firmly hold the insert 26 in place within the housing 14. For example, in some embodiments, the projections 130 may be designed to maintain the connector 118 in engagement with the housing 14 for pressures up to about 20 psi.

Figure 7:
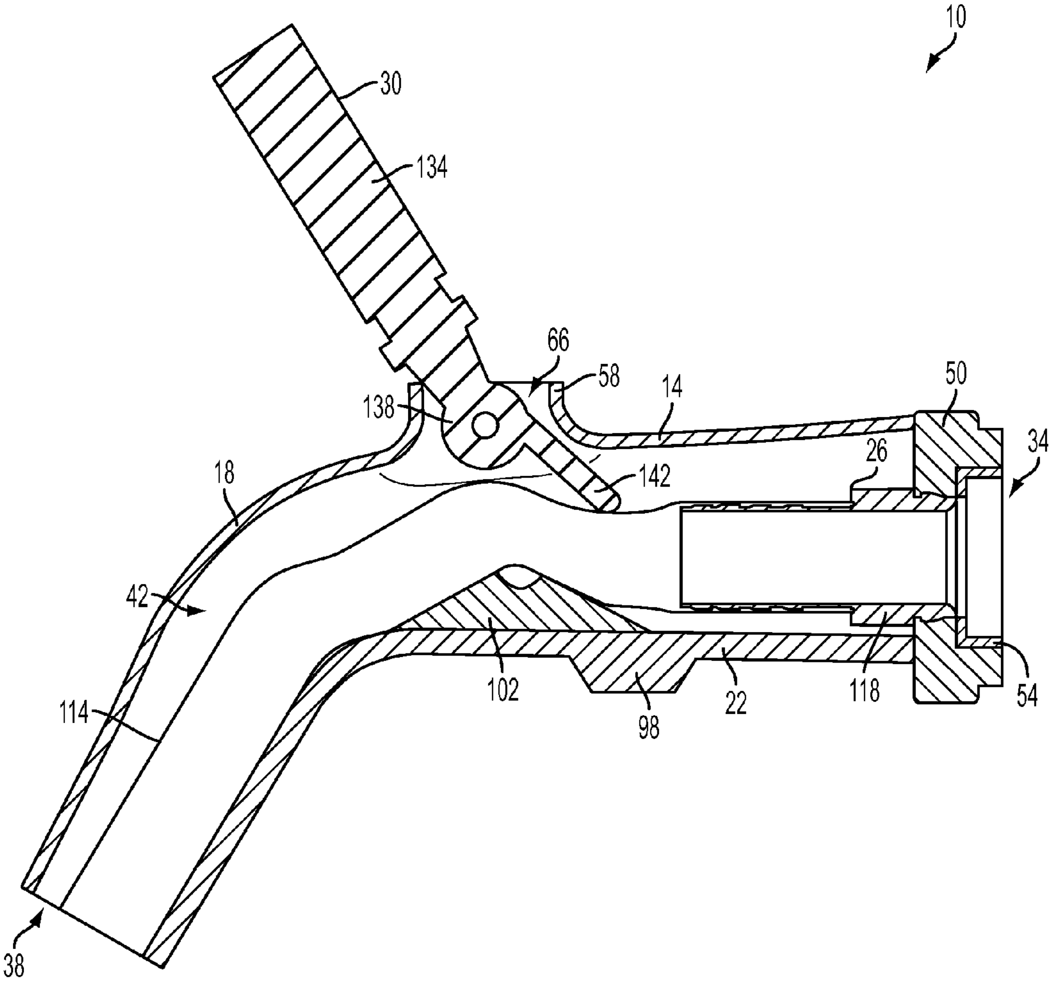
FIG. 7 is a cross-sectional view of the faucet assembly of FIG. 1, the faucet assembly including an actuator in an open or dispensing position.

As shown in FIG. 7, the replaceable insert 26 is positioned within the passageway 42 of the housing 14 to direct liquid (e.g., beverages) from the beverage source out of the faucet assembly 10. The illustrated insert 26 extends from the inlet end 34 to the outlet end 38 of the housing 14 and bends to generally match the L-shape of the housing 14. The insert 26 thereby directs liquid through the passageway 42 such that the liquid does not contact the metal surfaces of the housing 14. As such, the housing 14 itself does not need to be cleaned at regular intervals. Instead, the insert 26 can be easily removed and replaced with a new insert after a set period of time (e.g., every two weeks). For example, when the insert 26 is sufficiently dirty and needs to be replaced, the lower cover 22 of the housing 14 can be slid laterally off of the body 18 (i.e., moved to an open position), allowing access to the passageway 42 and the insert 26. The insert 26 can then be removed from the housing 14 by pulling the connector 118 away from the connector portion 50 of the outer body 18. A new insert can then be inserted into the passageway 42 and pushed into the connector portion 50. Afterward, the cover 22 can be slid back onto the lower end 46 of the outer body 18 (i.e., moved to a closed position) to enclose the passageway 42 and support the new insert. This entire replacement process can be carried out without disconnecting or removing the outer body 18 of the housing 14 from the structure S associated with the beverage source.

Figure 8:
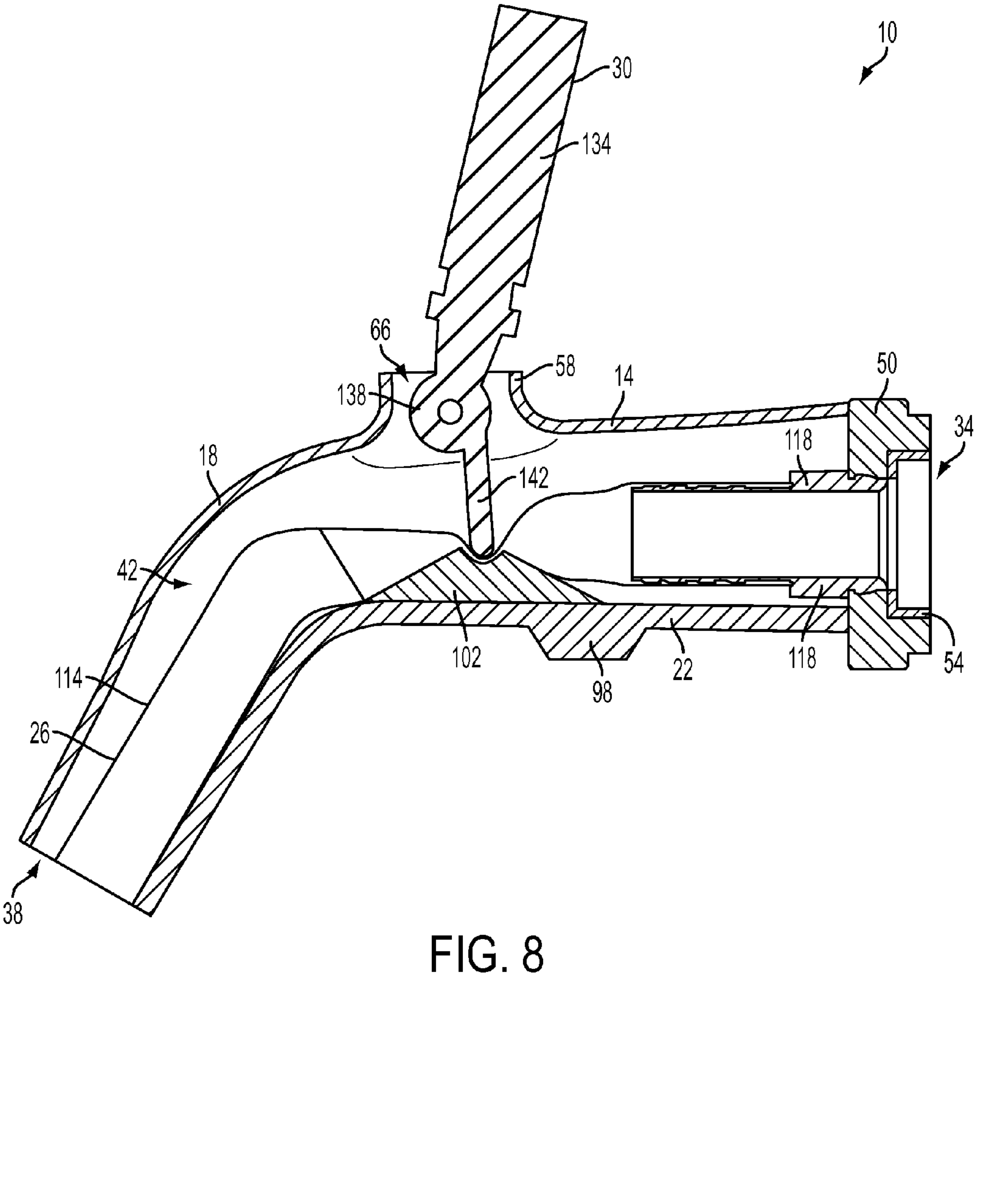
FIG. 8 is a cross-sectional view of the faucet assembly of FIG. 1 with the actuator in a closed position.

The actuator 30 is coupled to the mount portion 58 of the outer body 18 to selectively control fluid flow through the insert 26. As shown in FIGS. 4, 7, and 8, the illustrated actuator 30 includes a handle portion 134, a pivot portion 138, and a valve portion 142. The handle portion 134 extends outwardly from the housing 14 and is configured to be grasped by a user. The pivot portion 138 is positioned within the mount portion 58 of the outer body 18 to pivotally couple the actuator 30 to the housing 14. The pin 74 (FIGS. 2 and 3) extends from the pivot portion 138 and is received in the side openings 70 of the mount portion 58 to mount the actuator 30 to the housing 14. The valve portion 142 extends from the pivot portion 138 into the passageway 42 of the housing 14. In the illustrated embodiment, the handle portion 134, the pivot portion 138, and the valve portion 142 are integrally formed as a single piece such that the actuator 30 is a unitary component. In other embodiments, the actuator 30 may be formed of multiple pieces that are permanently or removably coupled together.

In operation, the valve portion 142 of the actuator 30 selectively pinches the insert 26 closed to block fluid flow through the faucet assembly 10. When the actuator 30 is in an open, or dispensing, position (FIG. 7), the valve portion 142 is pivoted away from the ramp 102 extending from the lower cover 22 such that liquid can flow substantially uninterrupted through the insert 26. In this position, liquid can flow through the insert 26, and thereby out of the faucet assembly 10, at a rate of about two ounces per second, assuming the liquid is traveling at a velocity of 36 inches per second and is stored at a pressure of 12 to 13 psi. When the actuator 30 is in a closed position (FIG. 8), the valve portion 142 is pivoted to fit within the recess 110 of the ramp 102. In this position, the insert 26 is pinched closed between the valve portion 142 and the ramp 102 such that liquid cannot flow through the insert 26. The recess 110 also functions as a detent to maintain the valve portion 142 in the closed position until a user purposefully pivots the actuator 30. A user can move the valve portion 142 between the open and closed positions by pivoting the handle portion 134 of the actuator 30 relative to the housing 14.

Figure 9:
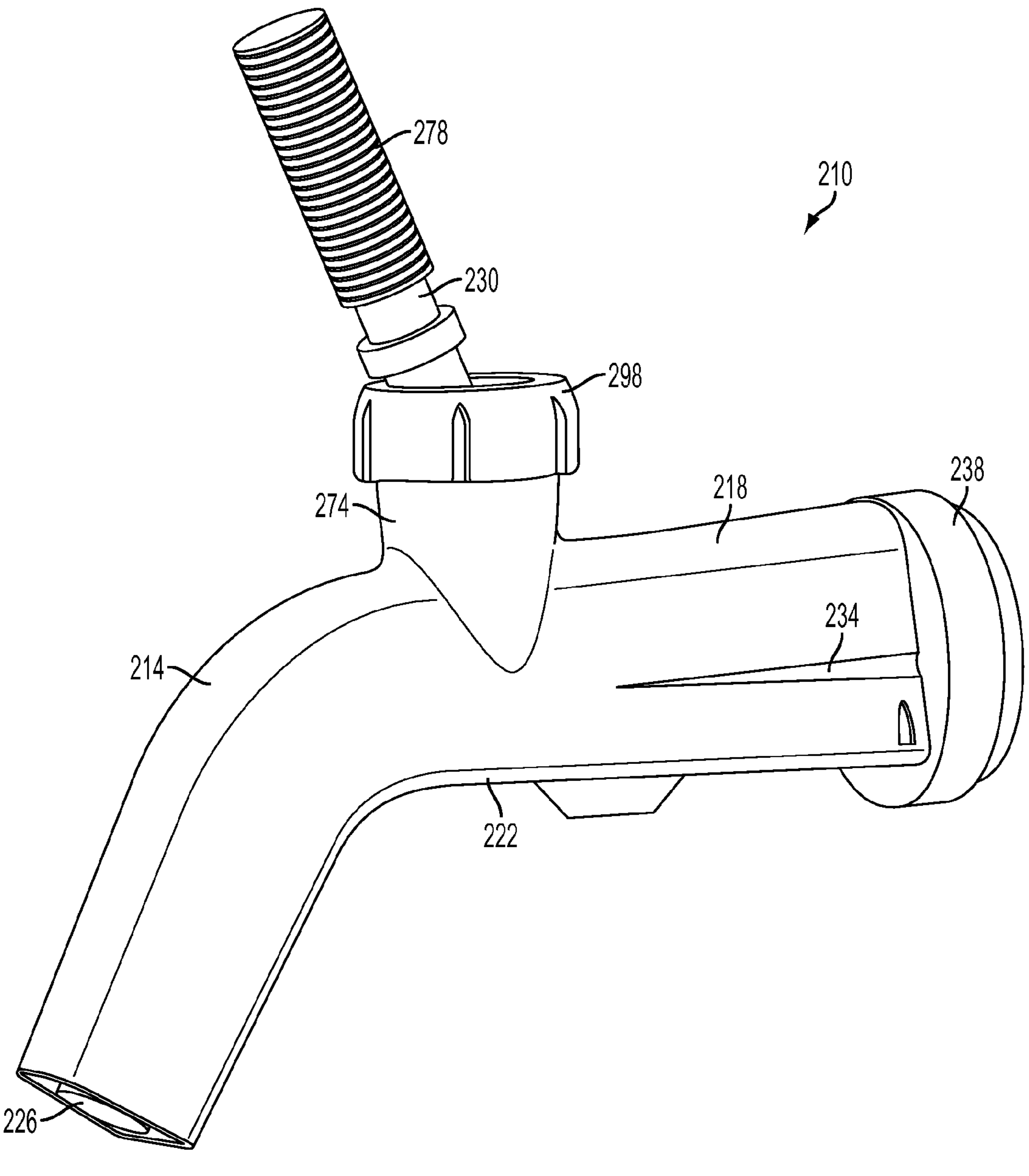
FIG. 9 is a perspective view of another faucet assembly embodying the invention.
Figure 10:
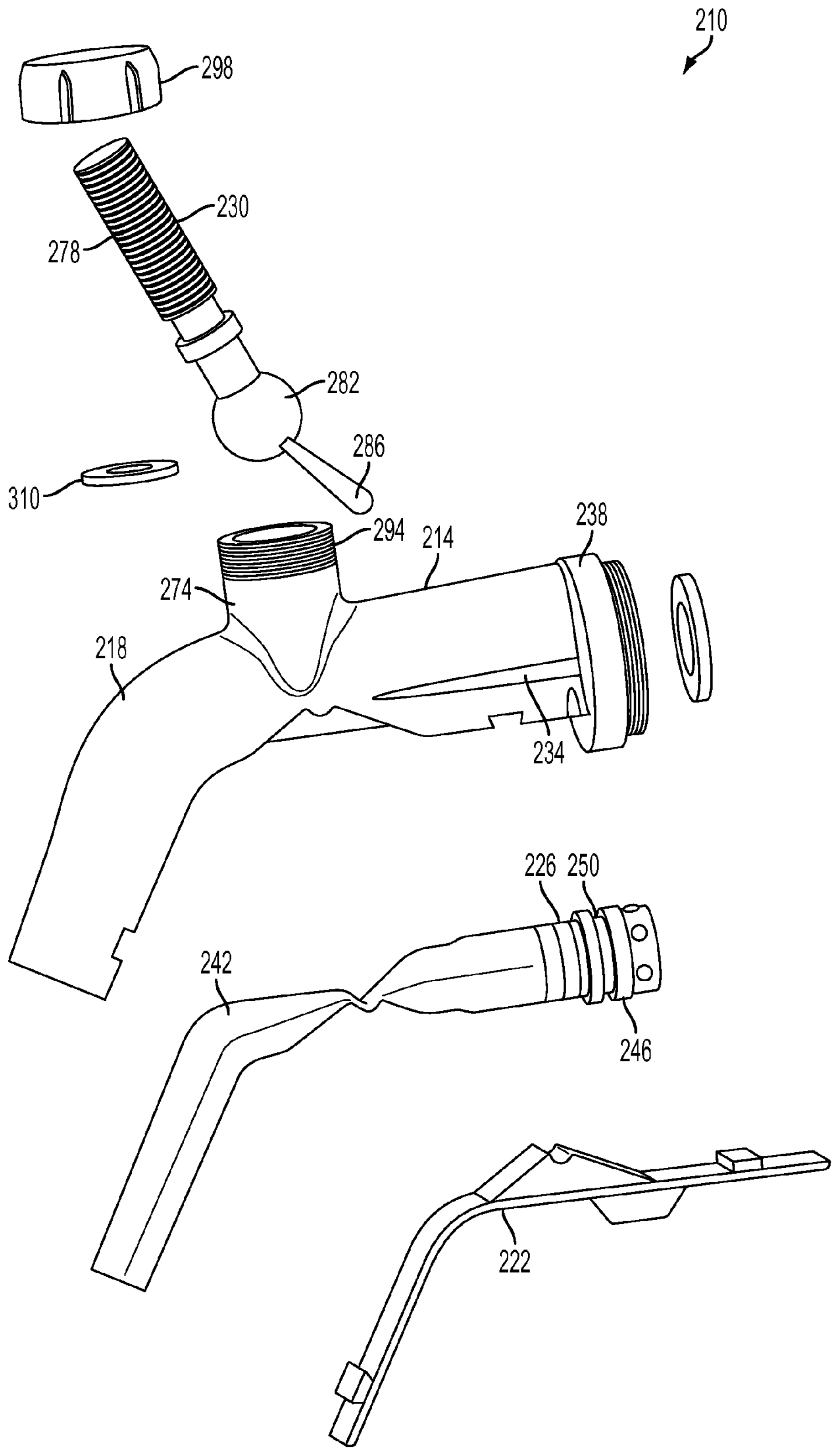
FIG. 10 is an exploded perspective view of the faucet assembly of FIG. 9.

FIGS. 9 and 10 illustrate another faucet assembly 210 for dispensing liquid from a beverage source. The illustrated faucet assembly 210 is similar to the faucet assembly 10 discussed above. Differences between the faucet assemblies 10, 210 are described below. Reference is made to the description of the faucet assembly 10 above for details of features and elements of the faucet assembly 210 not specifically discussed below.

The faucet assembly 210 includes a housing 214 having an outer body 218 and a detachable cover 222, a replaceable insert 226 positioned within the housing 214, and an actuator 230 pivotally coupled to the housing 214. The illustrated housing 214 includes two grooves 234, or slots, (only one of which is shown) formed in the outer body 218. The grooves 234 are formed on opposing sides of the outer body 218 adjacent a connector portion 238. The grooves 234 receive portions of a corresponding bracket that holds a brand badge (e.g., a sign that identifies the type of beverage or fluid being dispensed from the faucet assembly 210). In some embodiments, the grooves 234 may allow the bracket to be easily snapped onto and off of the faucet assembly 210.

Figure 14:
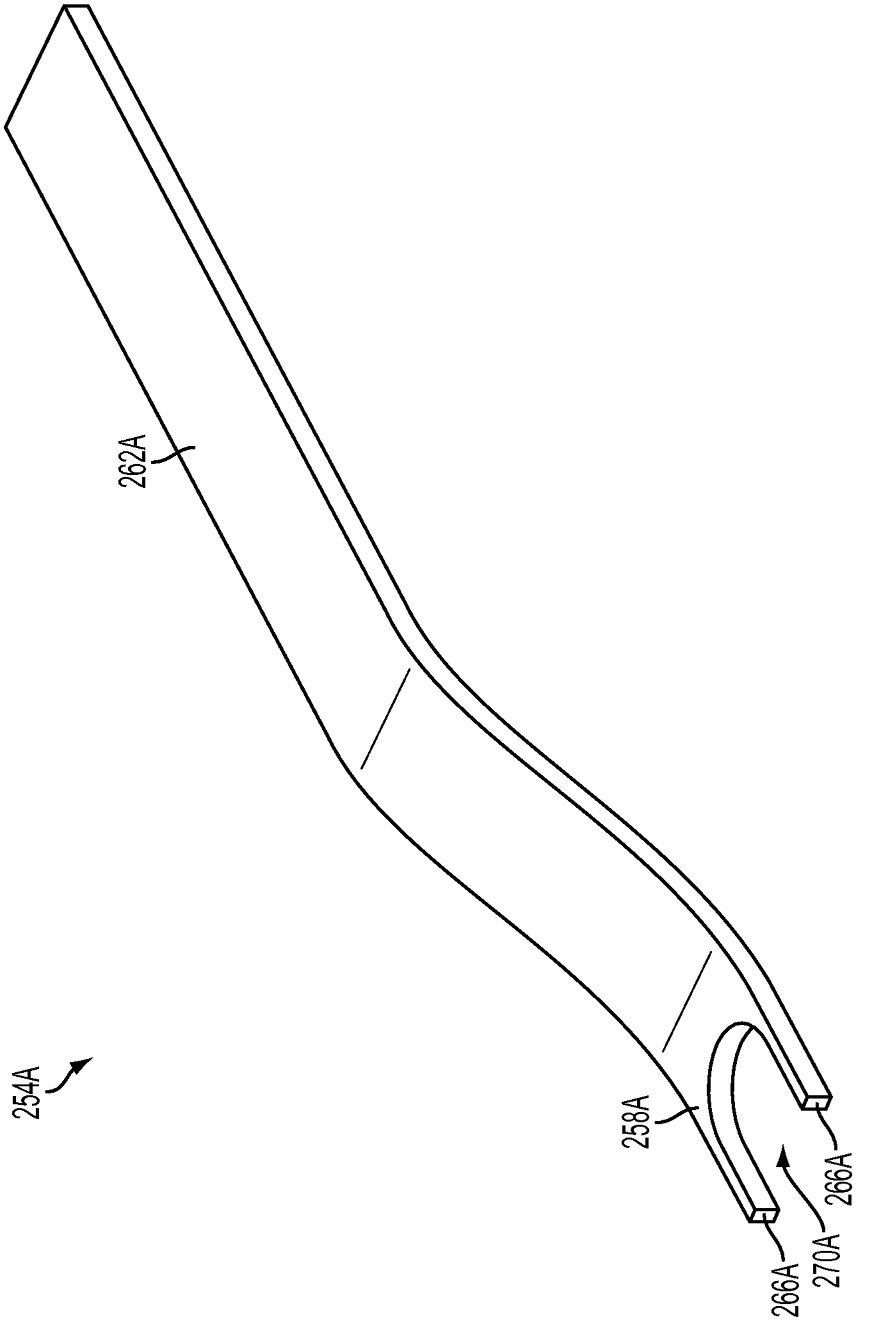
FIG. 14 is a perspective view of a tool for removing a replaceable insert from a faucet assembly.
Figure 15:
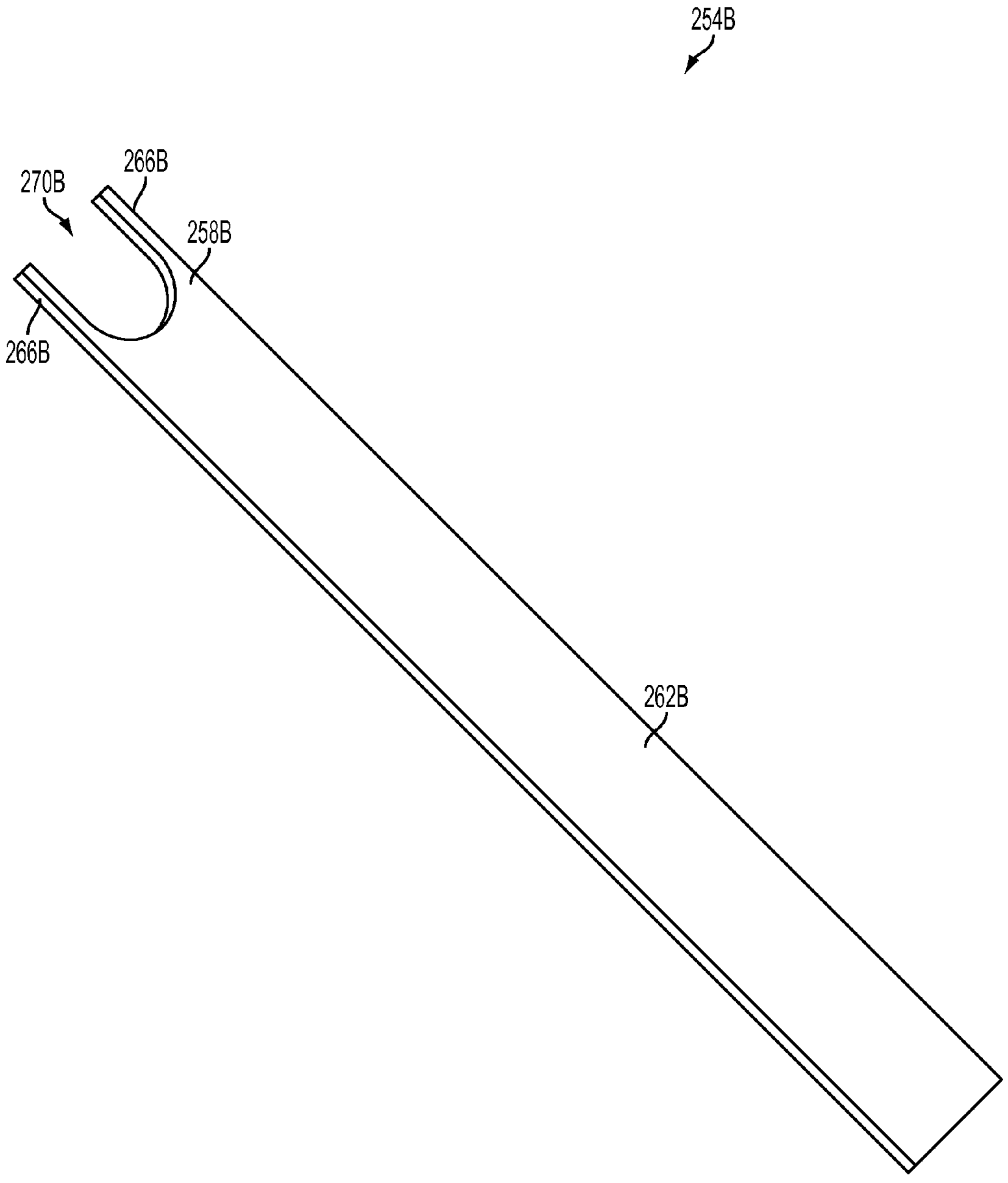
FIG. 15 is a perspective view of another tool for removing a replaceable insert from a faucet assembly.

Similar to the insert 26 discussed above, the replaceable insert 226 (FIG. 10) can be removed from the housing 214 after detaching the cover 222 from the outer body 218. In the illustrated embodiment, the insert 226 includes a bendable tube 242 and a connector 246 having an annular groove 250. The groove 250 is configured to receive an insert-removal tool 254A, B (FIGS. 14 and 15). As shown in FIGS. 14 and 15, each insert-removal tool 254A, B includes an engagement portion 258A, B and a handle portion 262A, B. The engagement portion 258A, B includes a U-shaped end having two fingers 266A, B and an opening 270A, B between the fingers 266A, B. The fingers 266A, B are shaped and sized to fit within the groove 250 of the connector 246. When the fingers 266A, B engage the connector 246, the corresponding tool 254A, B can be used to pull the connector 246 out of or push the connector 246 into the connector portion 238 of the housing 214. In the illustrated embodiment, the handle portion 262A of the first tool 246A is bent, while the handle portion 262B of the second tool 246B is generally straight or planar. In other embodiments, other suitable tools may be used to insert and remove the insert 226 from the housing 214, or the insert 226 may be inserted and removed from the housing 214 without a tool.

Figure 12:
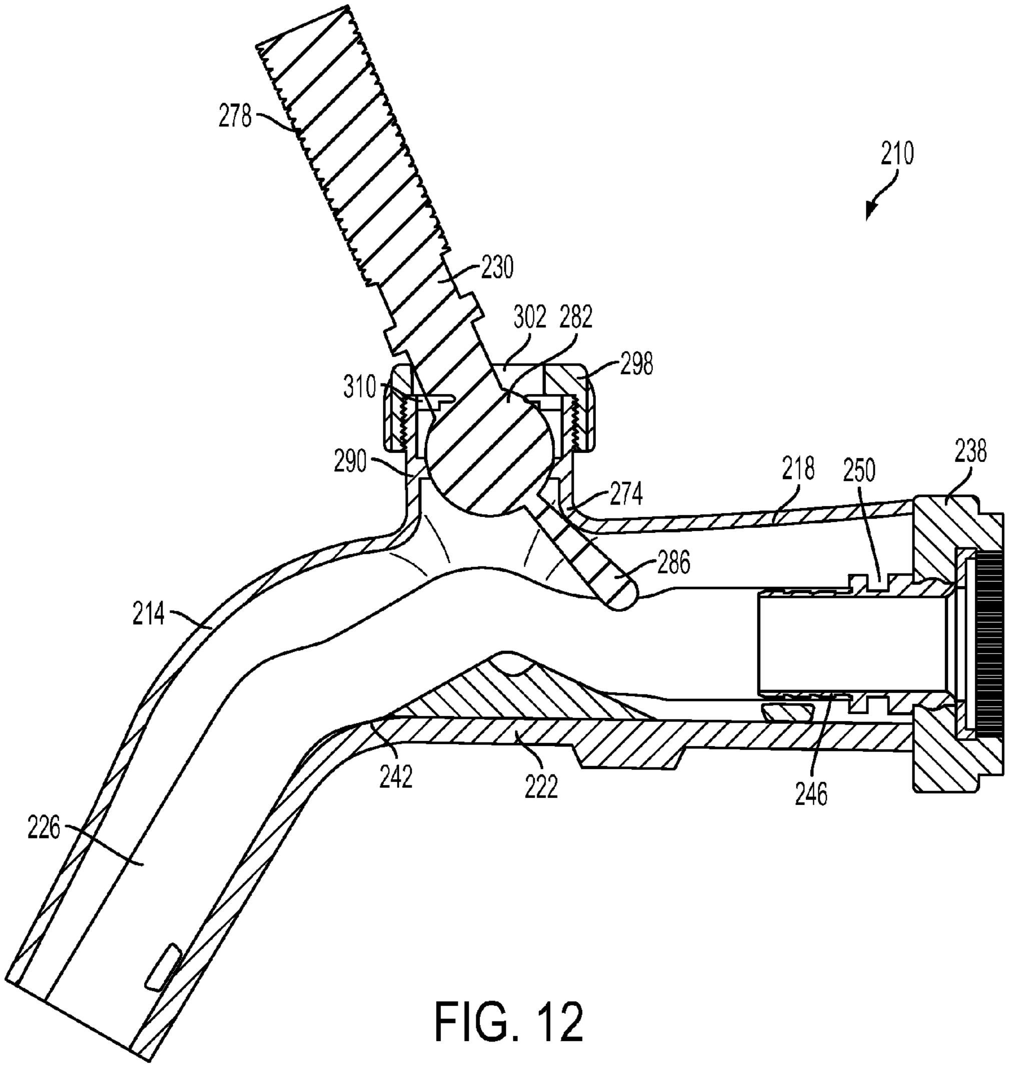
FIG. 12 is a cross-sectional view of the faucet assembly of FIG. 9, the faucet assembly including an actuator in an open or dispensing position.
Figure 13:
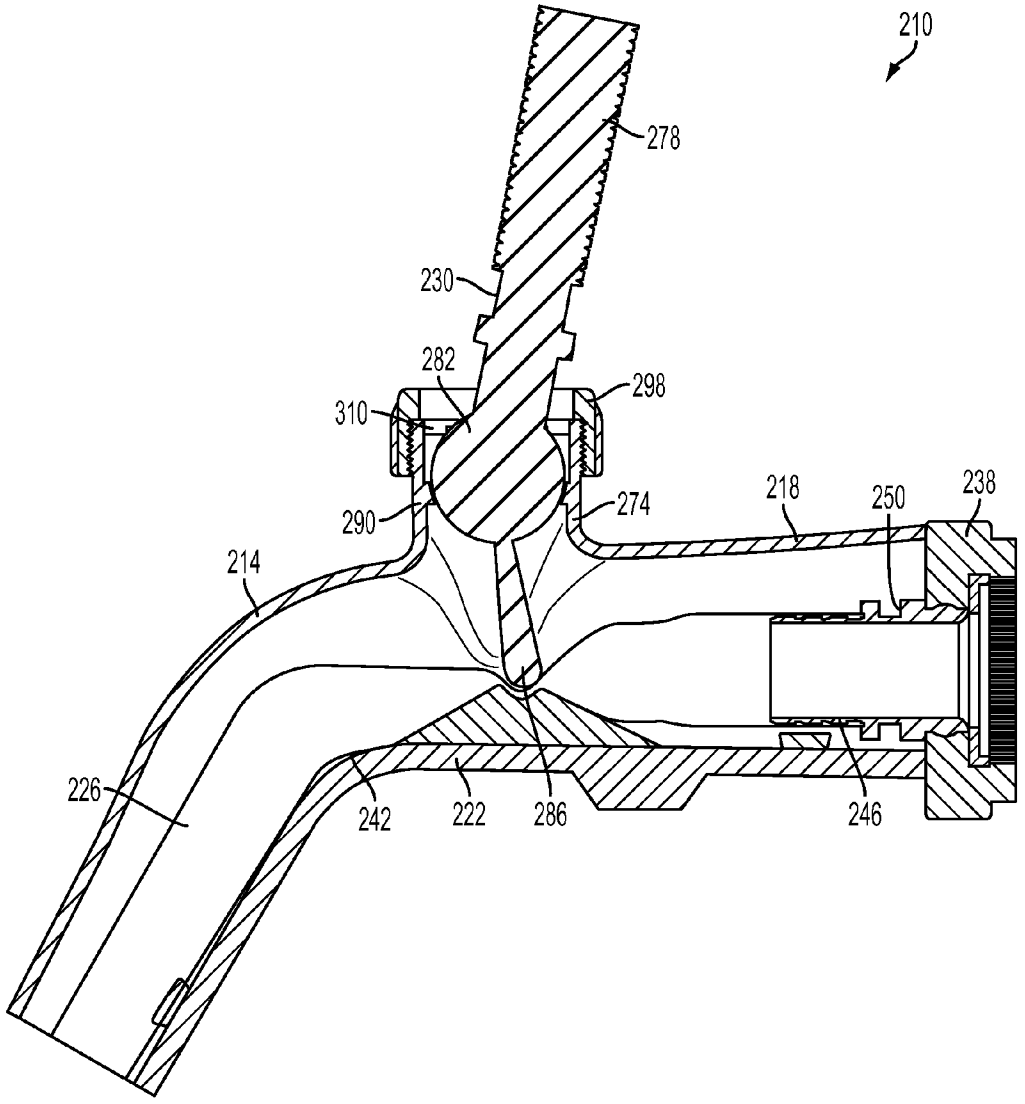
FIG. 13 is a cross-sectional view of the faucet assembly of FIG. 9 with the actuator in a closed position.

Referring back to FIG. 10, the actuator 230 is coupled to a mount portion 274 of the outer body 218 to selectively control fluid flow through the insert 226. Similar to the actuator 30 discussed above, the illustrated actuator 230 includes a handle portion 278, a pivot portion 282, and a valve portion 286. In the illustrated embodiment, the pivot portion 282 is a generally spherical ball. As shown in FIGS. 12 and 13, the mount portion 274 includes an inwardly-extending flange 290 that receives the spherical pivot portion 282 via a ball and socket-type mechanism, rather than a pivot pin. When seated on the flange 290, the pivot portion 282 allows the actuator 230 to move (e.g., pivot) relative to the housing 214 to move the valve portion 286 into and out of engagement with the insert 226.

Figure 11:
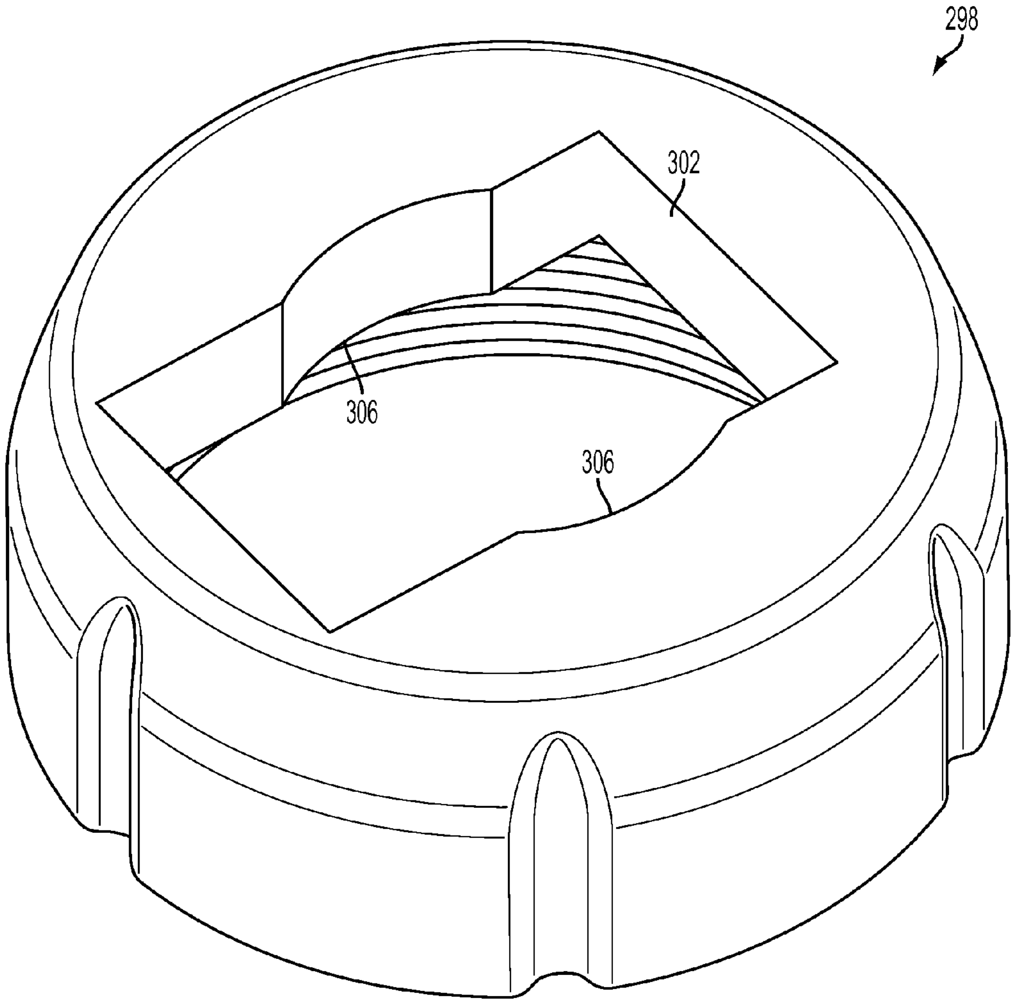
FIG. 11 is a perspective view of a handle cap for use with the faucet assembly of FIG. 9.

In addition, as shown in FIG. 10, the mount portion 274 of the outer body 218 includes a threaded upper end 294 and a handle cap 298. The handle cap 298 threadably engages the threaded upper end 294 to releasably secure the pivot portion 282 of the actuator 230 within the mount portion 274. As shown in FIG. 11, the handle cap 298 defines an aperture 302 that allows the handle portion 278 of the actuator 230 to extend out of the cap 298. The aperture 302 includes two side cutouts 306 that provide clearance for the spherical pivot portion 282 of the actuator 230. A gasket 310 (FIG. 10) is positioned between the handle cap 298 and the pivot portion 282 to generally block or cover the aperture 302 even when the actuator 230 moves (e.g., pivots) relative to the housing 214. The handle cap 298 allows the actuator 230 to be easily removed from the housing 214 for replacement or cleaning.

Operation of the faucet assembly 210 is generally the same as the faucet assembly 10 discussed above. FIG. 12 illustrates the actuator 230 in an open position to allow fluid flow through the insert 226. FIG. 13 illustrates the actuator 230 in a closed position to restrict or inhibit fluid flow through the insert 226.

Figure 16:
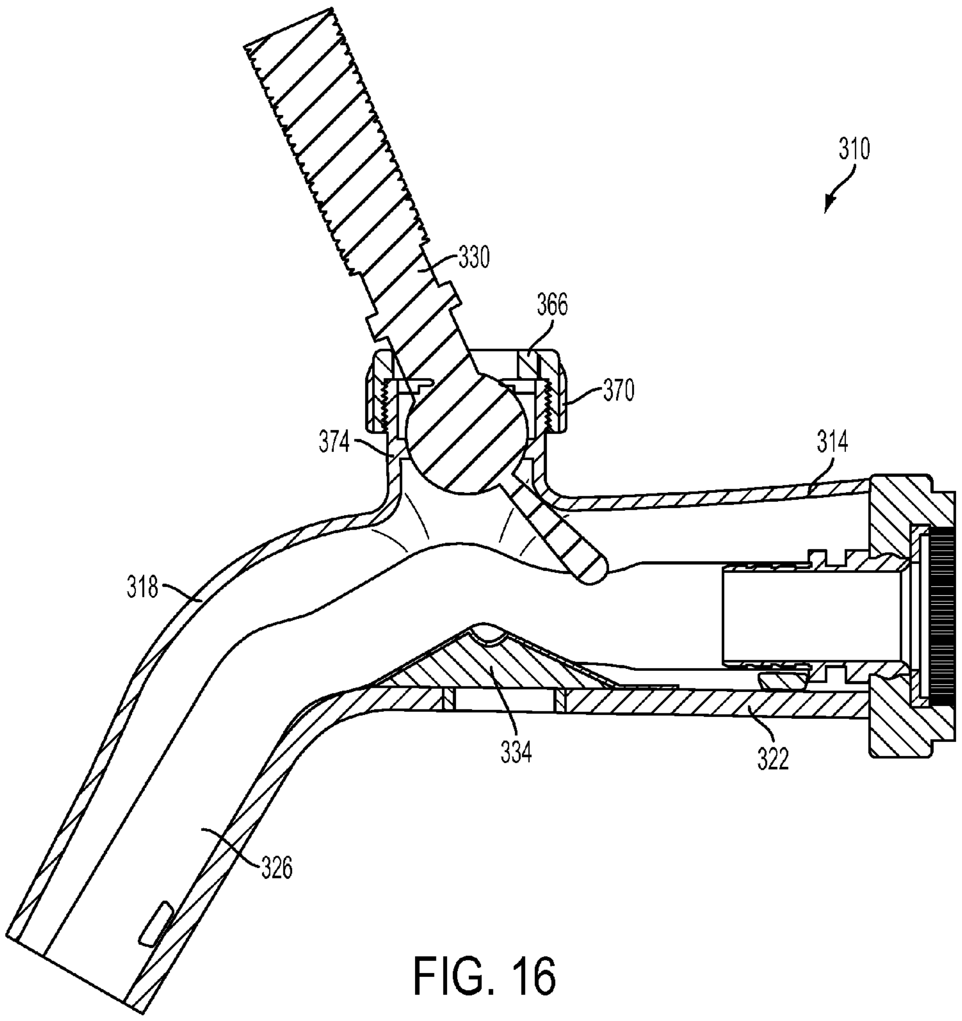
FIG. 16 is a cross-sectional view of another faucet assembly embodying the invention, the faucet assembly including an actuator in an open or dispensing position.
Figure 17:
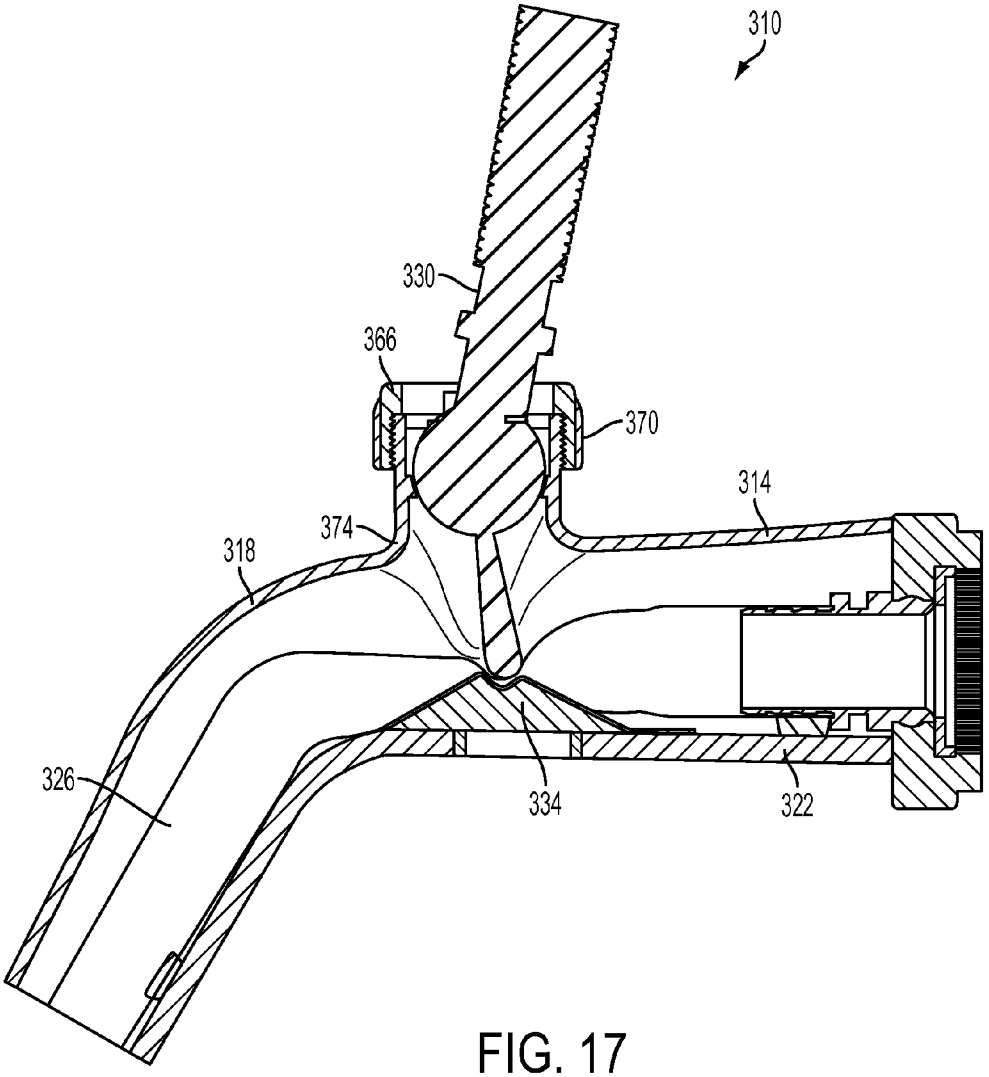
FIG. 17 is a cross-sectional view of the faucet assembly of FIG. 16 with the actuator in a closed position.

FIGS. 16 and 17 illustrate another faucet assembly 310 for dispensing liquid from a beverage source. The illustrated faucet assembly 310 is similar to the faucet assemblies 10, 210 discussed above. Differences between the faucet assemblies 10, 210, 310 are described below. Reference is made to the description of the faucet assemblies 10, 210 above for details of features and elements of the faucet assembly 310 not specifically discussed below.

The faucet assembly 310 includes a housing 314 having an outer body 318 and a detachable cover 322, a replaceable insert 326 positioned within the housing 314, and an actuator 330 pivotally coupled to the housing 314. Similar to the inserts 26, 226 discussed above, the replaceable insert 326 can be removed from the housing 314 after detaching the cover 322 from the outer body 318.

Figure 18:
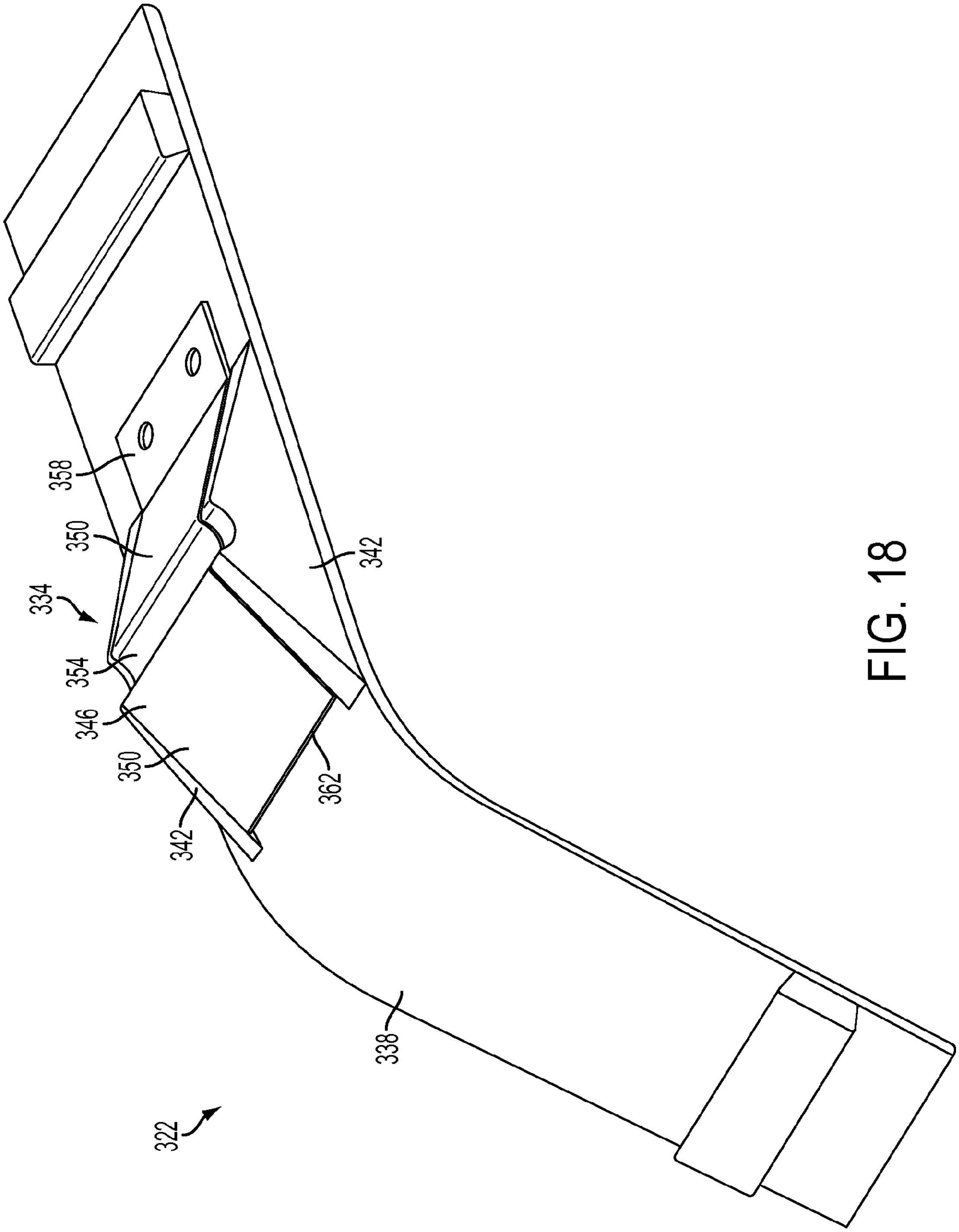
FIG. 18 is a perspective view of a lower cover of the faucet assembly of FIG. 16.

As shown in FIG. 18, the cover 322 includes a ramp or projection 334 extending from an inner surface 338 of the cover 322. In the illustrated embodiment, the ramp 334 includes two side supports 342 and a spring clip 346. Together, the side supports 342 and the spring clip 346 define two inclined surfaces 350 and a recess 354 formed at an apex of the inclined surfaces 350. The spring clip 346 is positioned between the side supports 342 and is composed of, for example, spring steel. One end 358 of the spring clip 346 is secured to the cover 322 via fasteners (e.g., rivets). An opposite end 362 of the spring clip 346 is free (i.e., unsecured) such that the clip 346 may deflect or deform to provide clearance for the actuator 330 during movement between an open position (FIG. 16) and a closed position (FIG. 17). When the actuator 330 is in the closed position, the spring clip 346 presses upward against the actuator 330 to help pinch the insert 326 closed and, thereby, restrict fluid flow through the insert 326.

Figure 19:
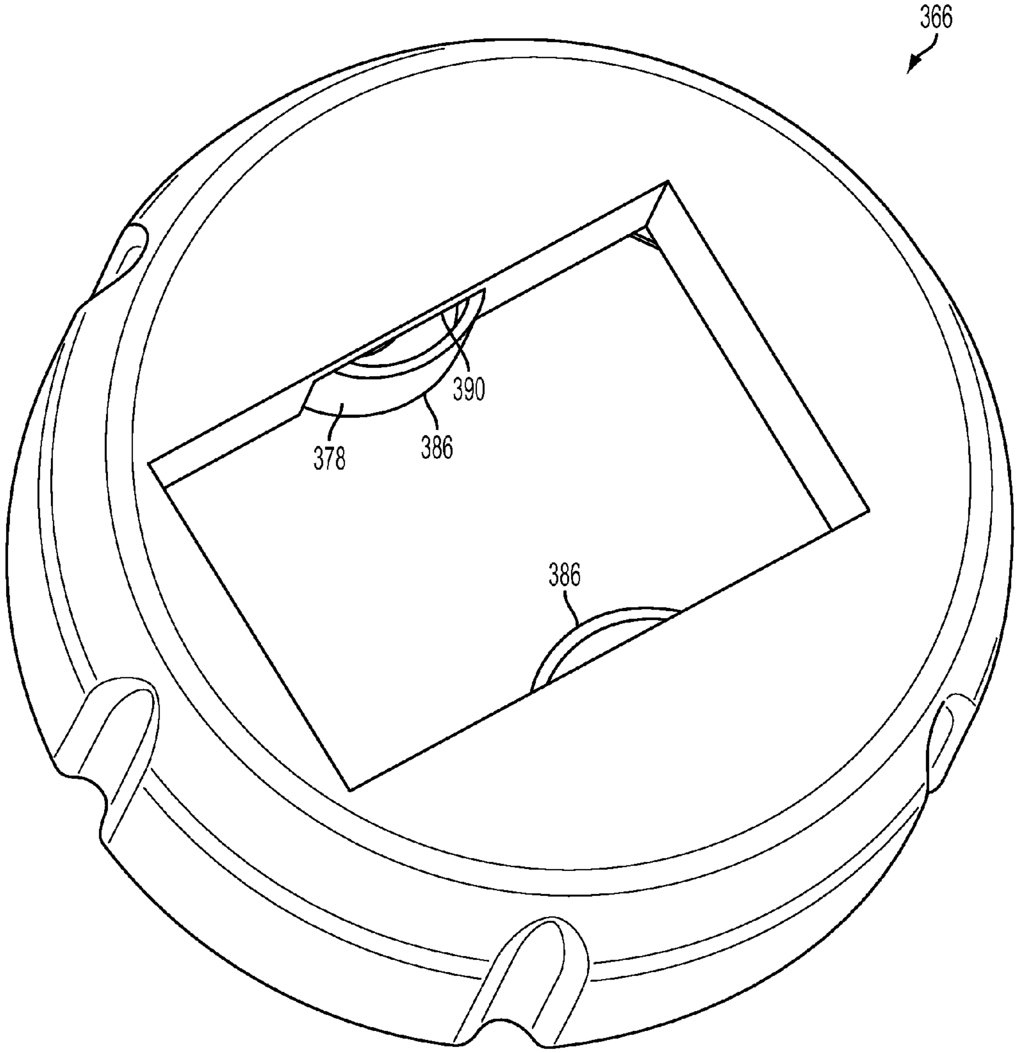
FIG. 19 is a top perspective view of a handle cap of the faucet assembly of FIG. 16.
Figure 20:
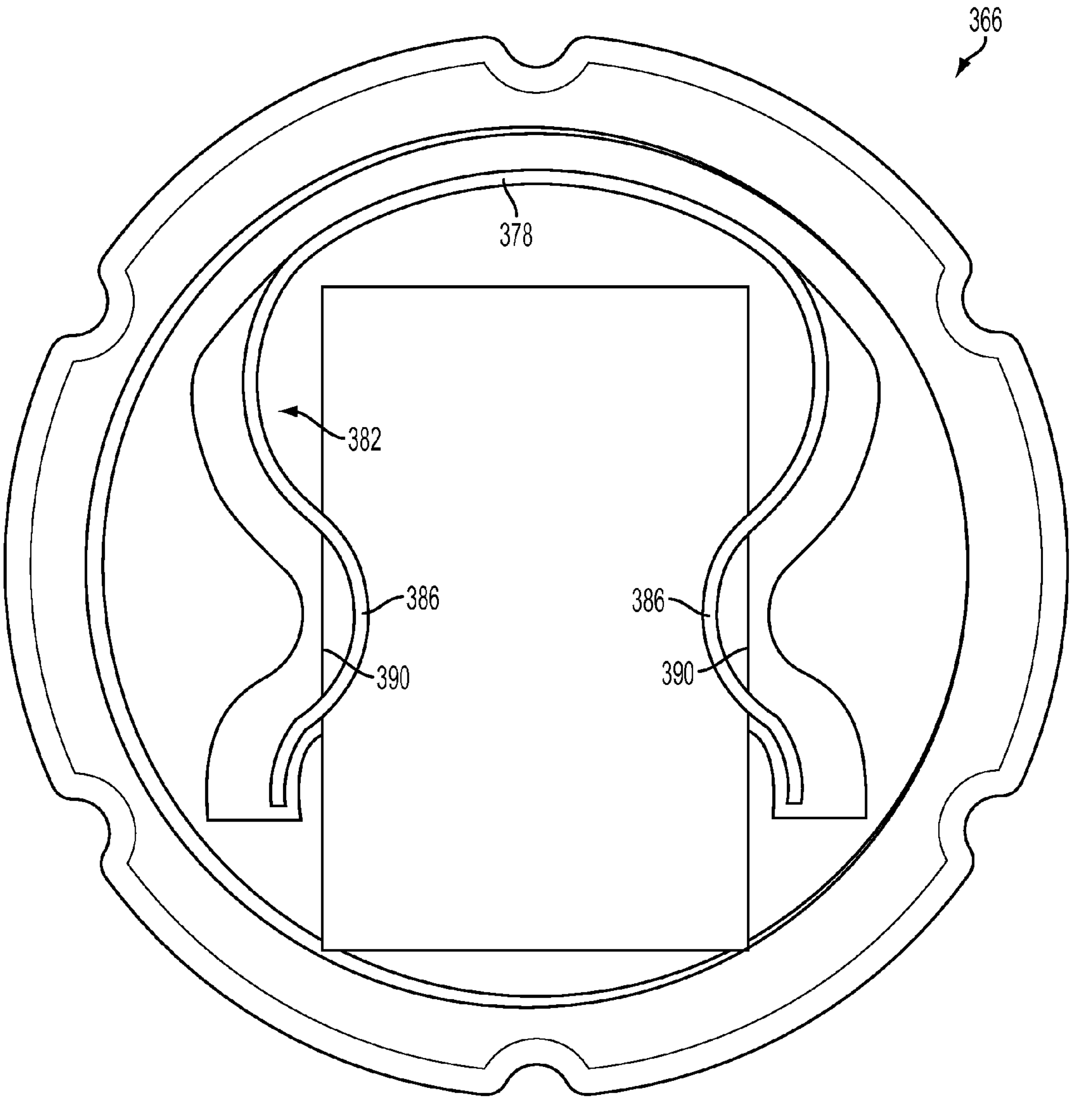
FIG. 20 is a bottom perspective view of the handle cap of FIG. 19.
Figure 21:
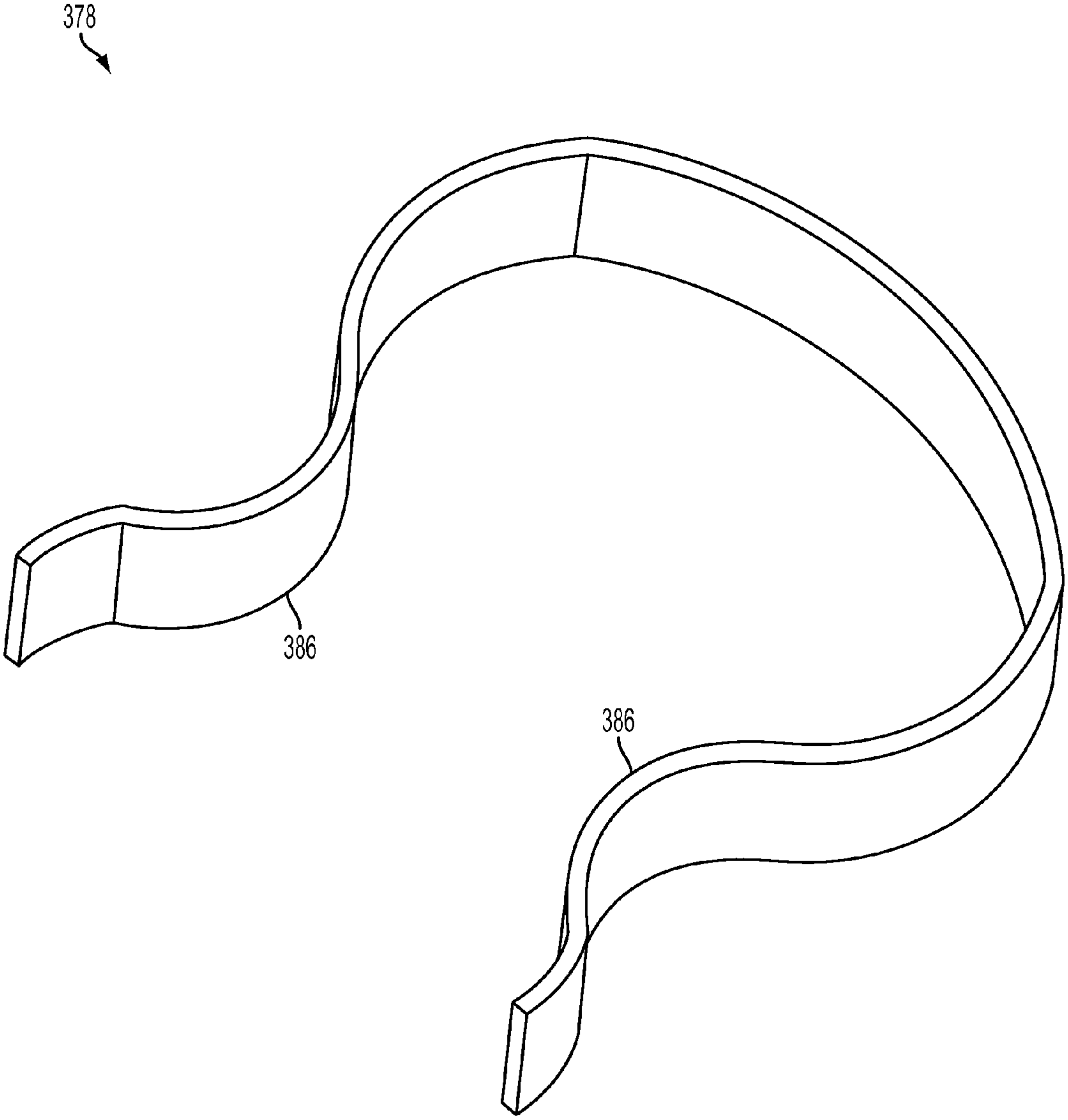
FIG. 21 is a perspective view of a spring clip of the handle cap of FIG. 19.

FIGS. 19 and 20 illustrate a handle cap 366 for releasably securing the actuator 330 to the housing 314. The handle cap 366 threadably engages a threaded upper end 370 (FIGS. 16 and 17) of a mount portion 374 of the housing 314. In the illustrated embodiment, the handle cap 366 also includes a spring clip 378 (FIG. 21). The spring clip 378 is generally bone-shaped and received within a corresponding recess 382 on an underside of the cap 366. Inwardly-bent portions 386 of the spring clip 378 extend through side openings 390 of the cap 366 to engage the actuator 330. The bent portions 386 bias the actuator 330 toward either the open position or the closed position, thereby inhibiting the actuator 330 from remaining in an intermediate position between the open and closed positions.

Operation of the faucet assembly 310 is generally the same as the faucet assemblies 10, 210 discussed above.

FIGS. 22-27 illustrate another faucet assembly 410 for dispensing liquid from a beverage source. The illustrated faucet assembly 410 is similar to the faucet assemblies 10, 210, 310 discussed above. Differences between the faucet assemblies 10, 210, 310, 410 are described below. Reference is made to the description of the faucet assemblies 10, 210, 310 above for details of features and elements of the faucet assembly 410 not specifically discussed below.

The faucet assembly 410 includes a housing 414 having an outer body 418 and a cover 422 (FIG. 23), a replaceable insert 426 (FIGS. 23-25) positioned within the housing 414, and an actuator 430 supported by and pivotally coupled to the housing 414. The housing 414 includes an inlet end 434 and an outlet end 438. The inlet end 434 receives liquid (e.g., a beverage) from the beverage source, while the outlet end 438 dispenses the liquid to a user. The housing 414 also defines a passageway 442 (FIGS. 24 and 25) extending through the housing 414 from the inlet end 434 to the outlet end 438. The passageway 442 is configured to receive the insert 426 to direct liquid from the beverage source out of the faucet assembly 410.

The outer body 418 includes a connector portion 446 formed at the inlet end 434 of the housing 414. The connector portion 446 is configured to mount the faucet assembly 410 to a structure S associated and in fluid communication with the beverage source. A gasket 450 (FIGS. 23-25) is positioned within the connector portion 446 of the body 418. The gasket 450 engages a fluid pipe, line, or conduit extending from the beverage source to connect the faucet assembly 410, and more particularly the insert 426, to the beverage source.

Figure 23:
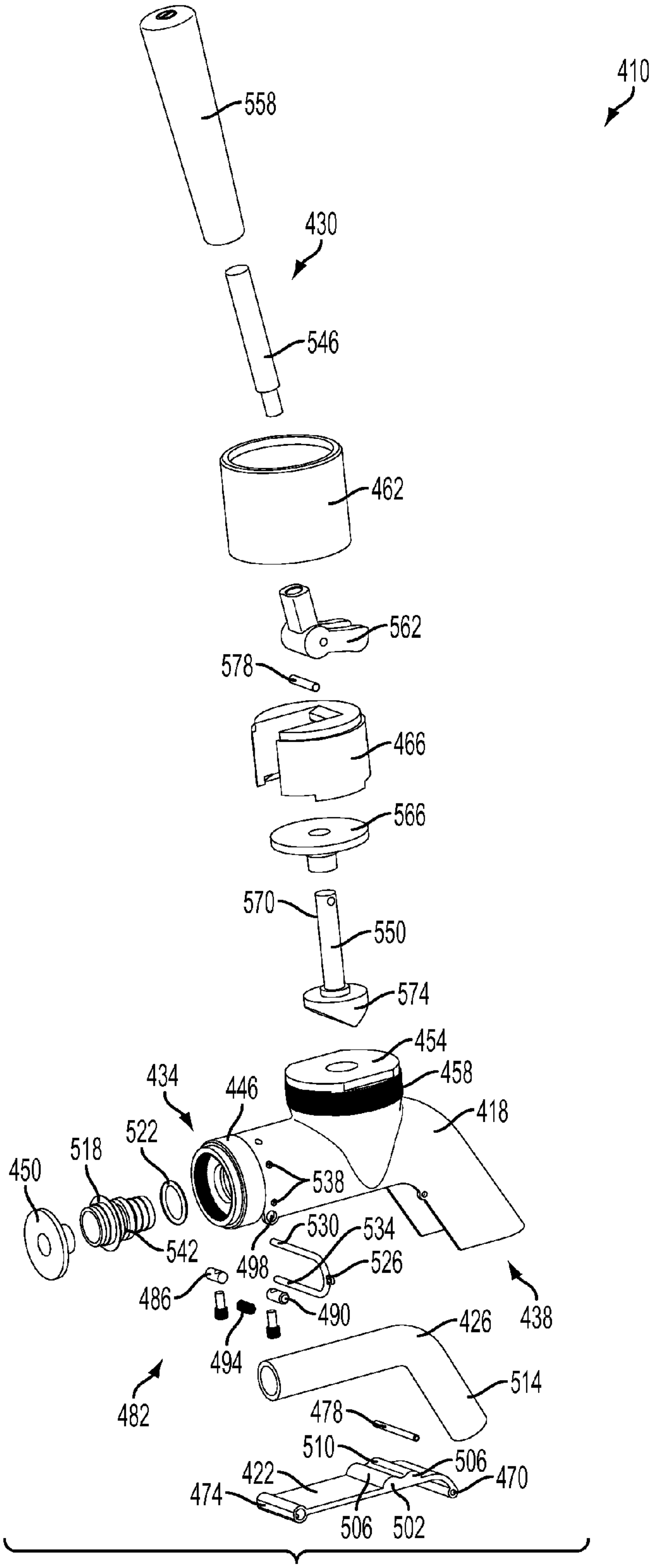
FIG. 23 is an exploded perspective view of the faucet assembly of FIG. 22.

The body 418 also includes a mount portion 454. The mount portion 454 is formed on an upper portion of the outer body 418 and pivotally supports the actuator 430. As shown in FIG. 23, an outer surface 458 of the mount portion 454 is threaded to threadably connect a cap 462 to the housing 414. The cap 462 captures a positioning block 466 within the mount portion 454. The positioning block 466 supports and guides the actuator 430 during movement of the actuator 430 relative to the housing 414.

Figure 26:
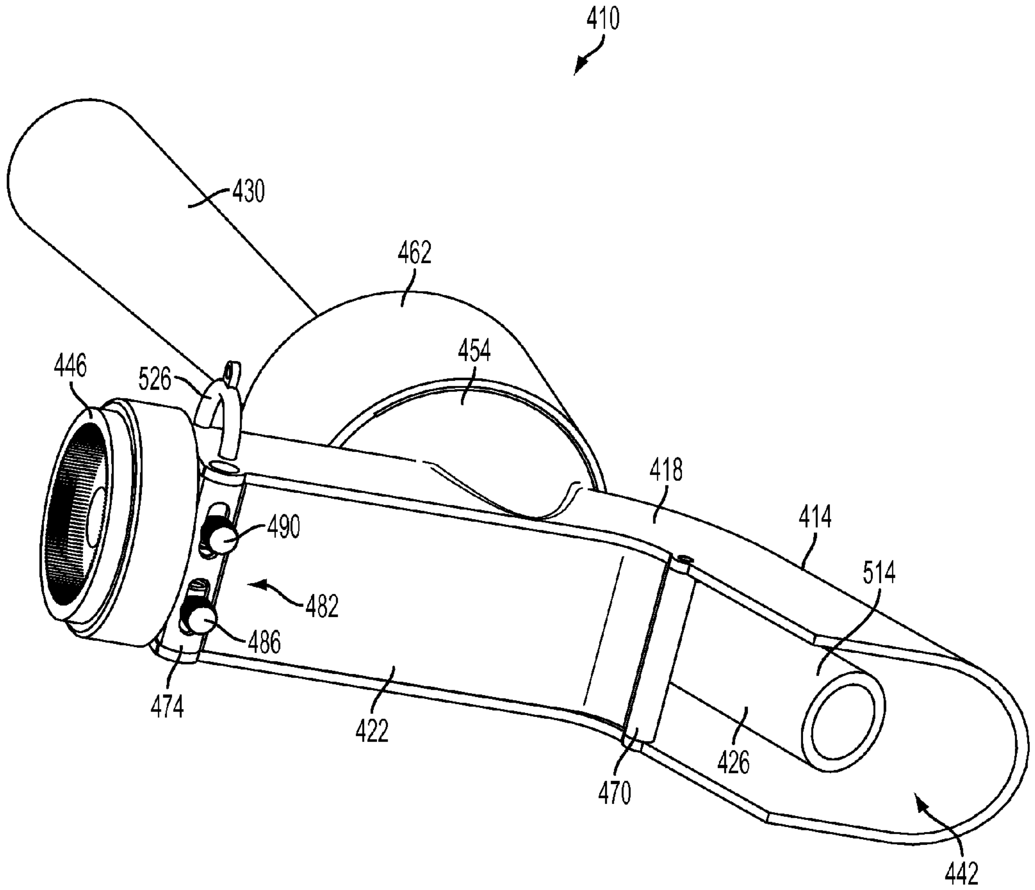
FIG. 26 is a bottom perspective view of the faucet assembly of FIG. 22, the faucet assembly including a lower cover in a closed position.
Figure 27:
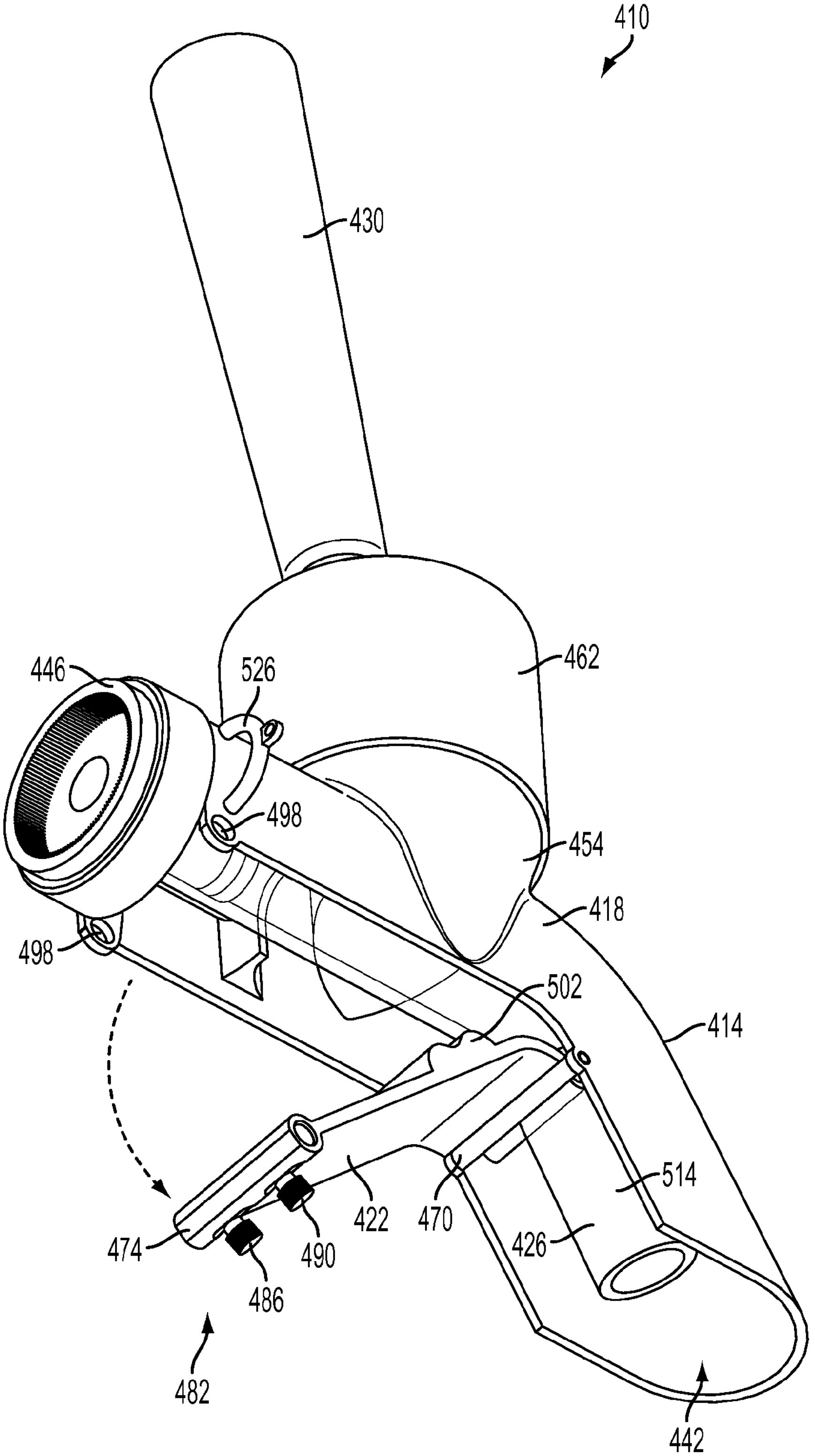
FIG. 27 is a bottom perspective view of the faucet assembly of FIG. 22 with the lower cover in an open position.

As shown in FIGS. 26 and 27, the cover 422 is movable relative to the body 418 while the body 418 is connected to the structure S associated with the beverage source to provide access to an interior (e.g., the passageway 442) of the housing 414. In the illustrated embodiment, the cover 422 is pivotally coupled to a lower portion of the body 418 for movement between a closed position (FIG. 26) and an open position (FIG. 27). When in the closed position, the cover 422 inhibits access to the interior of the housing 414 so that the insert 426 cannot be removed from the housing 414. When in the open position, the cover 422 is moved to allow access to the interior of the housing 414 so that the insert 426 can be removed from the housing 414 by a user.

The cover 422 includes a first end 470 and a second end 474 opposite the first end 470. The first end 470 of the cover 422 is pivotally attached to the body 418 by a pin 478. The cover 422 also includes a manual latch mechanism 482 located adjacent the second end 474. The latch mechanism 482 is "manual" in that it does not require any tools to operate. Instead, a user can actuate the latch mechanism 482 with his or her fingers to open the cover 422 and access the replaceable insert 426.

Figure 28:
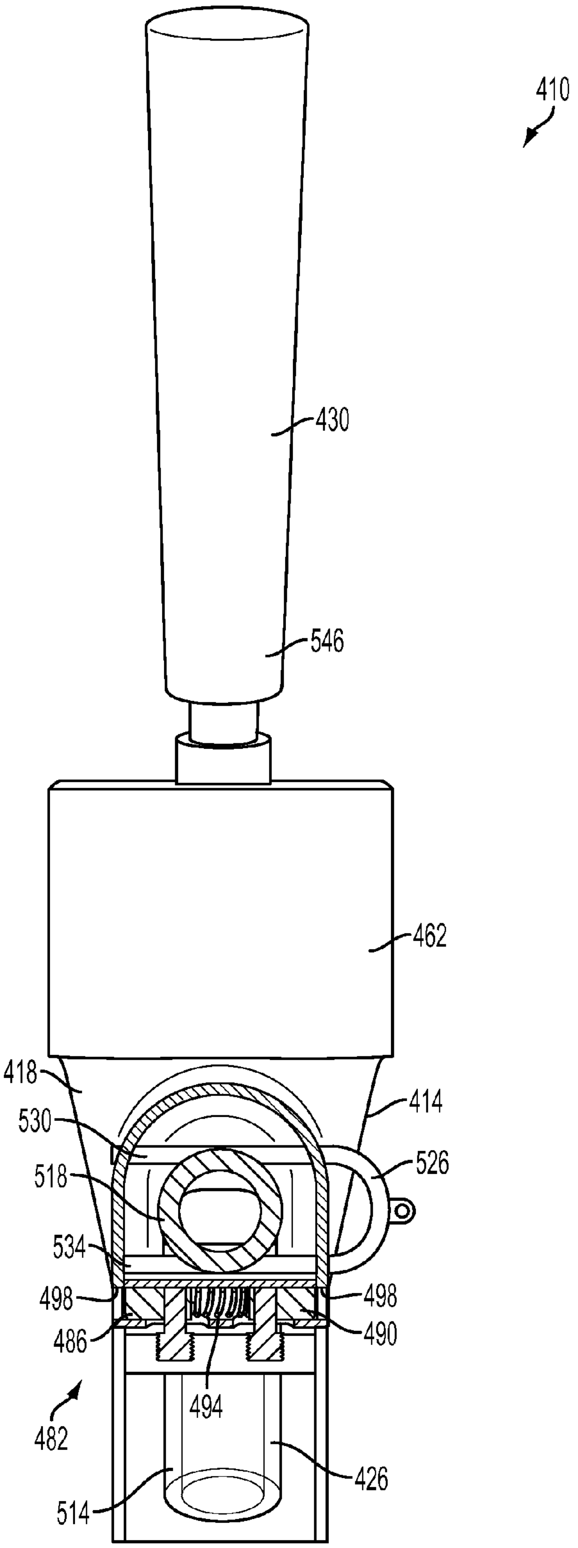
FIG. 28 is a cross-sectional view of the faucet assembly taken along section line 28-28 of FIG. 22, the faucet assembly including a latch mechanism for selectively securing the cover in the closed position.

As shown in FIGS. 23 and 28, the illustrated latch mechanism 482 includes a first release pin 486, a second release pin 490, and a biasing member 494. The release pins 486, 490 engage openings 498 in the body 418 to releasably secure the cover 422 in the closed position. The release pins 486, 490 are also movable (e.g., slidable) toward each other by squeezing the pins 486, 490 together to move the pins 486, 490 out of the openings 498 in the body 418. Once the pins 486, 490 clear the openings 498, the cover 422 can be pivoted or swung open relative to the body 418 (as shown in FIG. 27) by a user or under the force of gravity.

Referring to FIG. 28, the biasing member 494 is positioned between the release pins 486, 490 to bias the pins 486, 490 away from each other. That is, when the release pins 486, 490 are not squeezed together by a user, the biasing member 494 biases the release pins 486, 490 outwardly. When the cover 422 is moved to the closed position so that the release pins 486, 490 are properly aligned with the openings 498 in the body 418, the pins 486, 490 slide into the openings under the bias of the biasing member 494 to secure the cover 422 in the closed position. In the illustrated embodiment, the biasing member 494 is a coil spring. In other embodiments, other suitable biasing members may additionally or alternatively be employed.

As shown in FIG. 23, the cover 422 also includes a projection 502 that extends into the passageway 442 and generally toward the actuator 430. The projection 502 is located closer to the first end 470 of the cover 422 than to the second end 474. The illustrated projection 502 includes two lobes 506 with a recess 510 formed between the lobes 506. The recess 510 is configured to receive a portion of the actuator 430 and the insert 426 when the insert 426 is pinched closed (as shown in FIG. 24) to help inhibit fluid flow through the insert 426.

Similar to the inserts 26, 226, 326 discussed above, the repleaceable insert 426 of the faucet assembly 410 includes a flexible tube 514 and a connector 518. As shown in FIGS. 24 and 25, the connector 518 is releasably secured to the body 418 adjacent the inlet end 434 of the housing 414. The connector 518 surrounds a portion of the gasket 450 to connect the insert 426 to the beverage source. A seal 422 (e.g., an O-ring) is also positioned between an outer surface of the connector 518 and an inner surface of the body 418.

Figure 22:
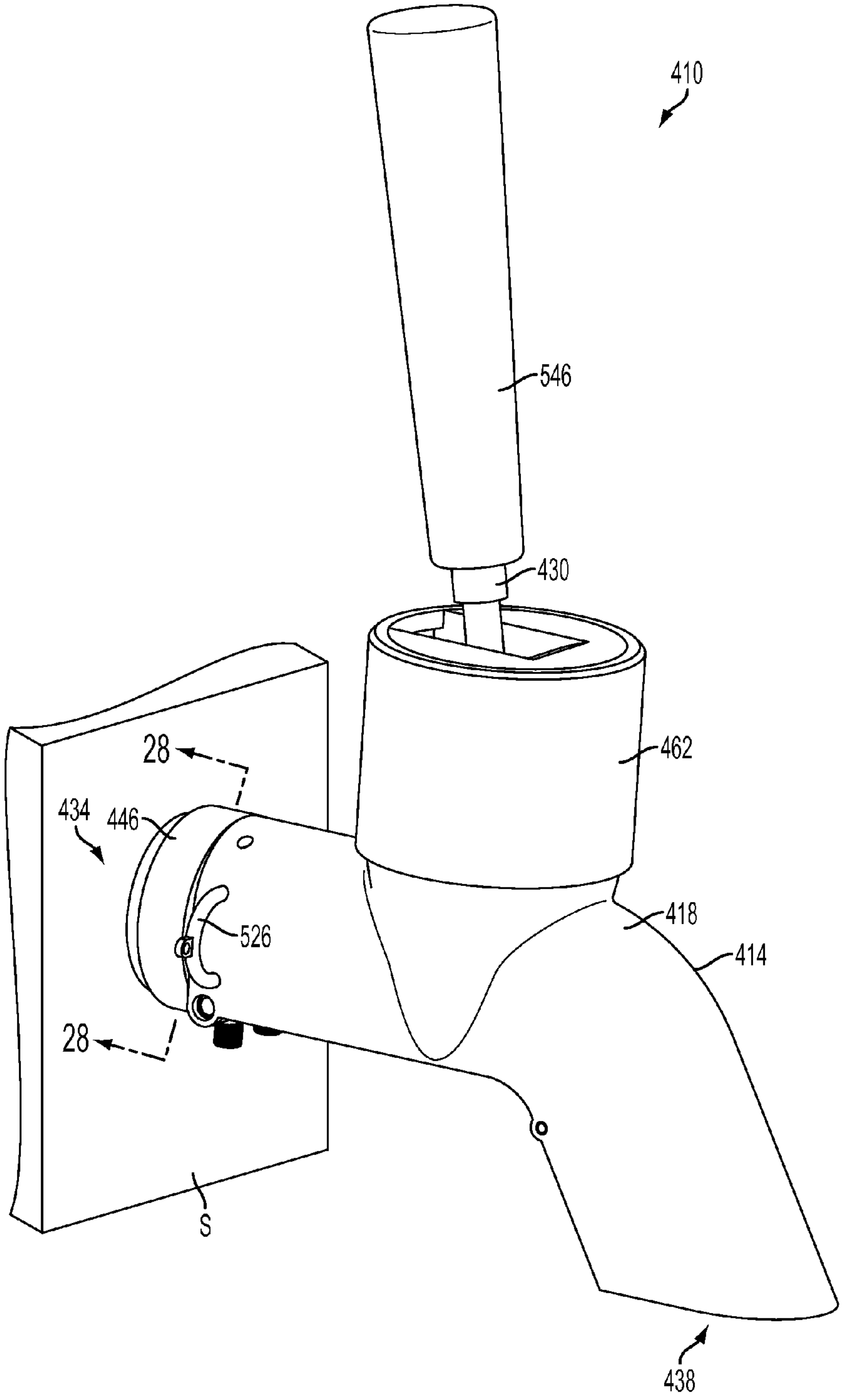
FIG. 22 is a perspective view of another faucet assembly embodying the invention.

Referring to FIGS. 22 and 23, the faucet assembly 410 further includes a release pin 526 to secure the insert 426 within the housing 414. The illustrated release pin 526 is generally U-shaped and includes a first leg 530 and a second leg 534. The legs 530, 534 extend through openings 538 in the body 418 and engage a groove 542 formed in the connector 518. Due to the U-shape of the release pin 526, the legs 530, 534 engage opposing sides of the connector 518 to secure the connector 518, and thereby the insert 526, within the housing 414. The release pin 526 is removable from the body 418 to unsecure the connector 518 of the insert 526 from the body 418. In the illustrated embodiment, the release pin 526 is manually slidable (e.g., pullable) away from the connector 518 to disengage the connector 518 and unsecure the insert 426 from the housing 414. In some embodiments, the release pin 526 may be pulled entirely out of the body 418 to unsecure the insert 426 from the housing 414. In other embodiments, the release pin 526 may remain connected to the body 418 when the pin 526 disengages the connector 518 so that the pin 526 is not entirely removed from the housing 414.

Figure 24:
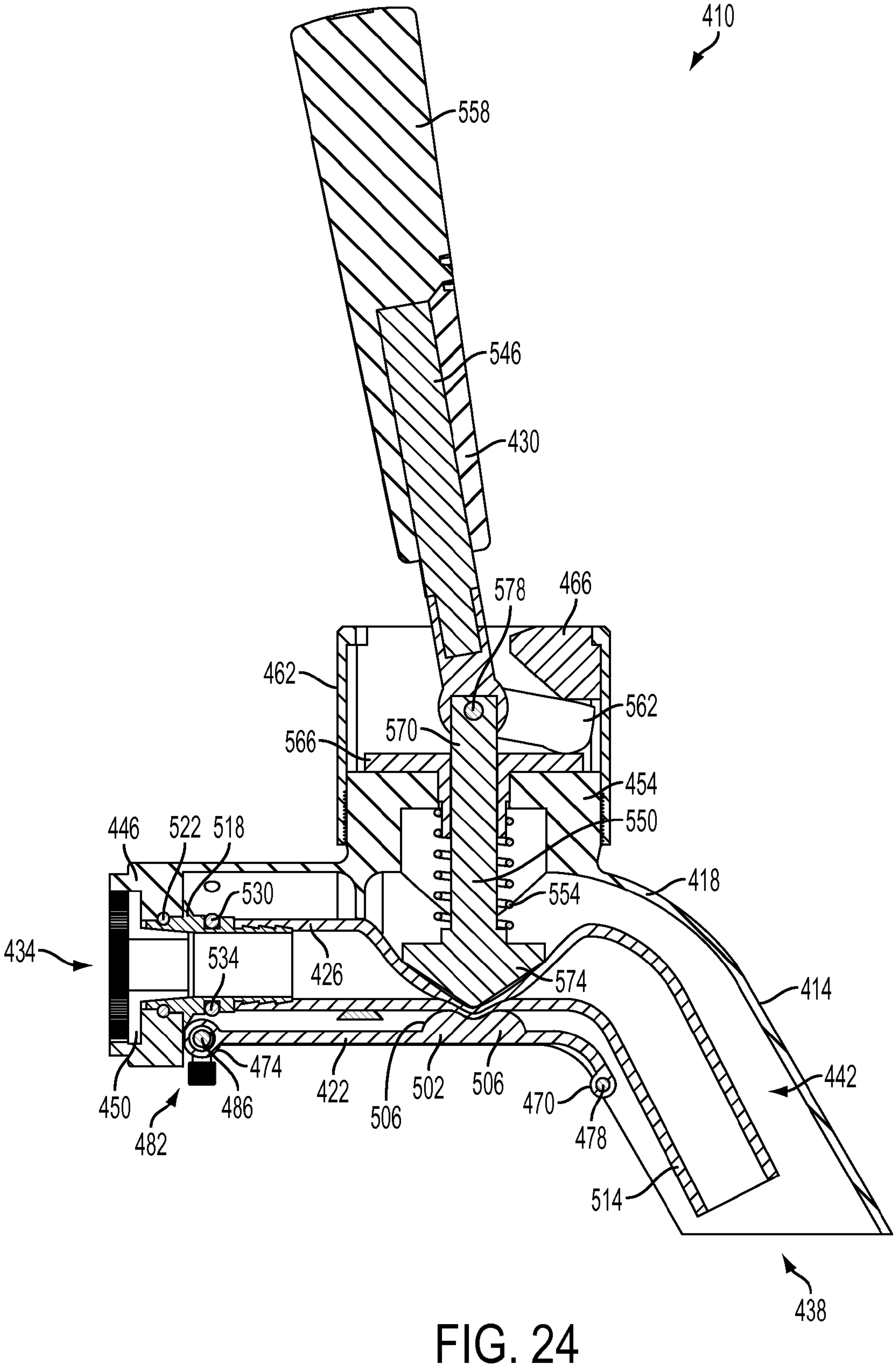
FIG. 24 is a cross-sectional view of the faucet assembly of FIG. 22, the faucet assembly including an actuator in a closed position.
Figure 25:
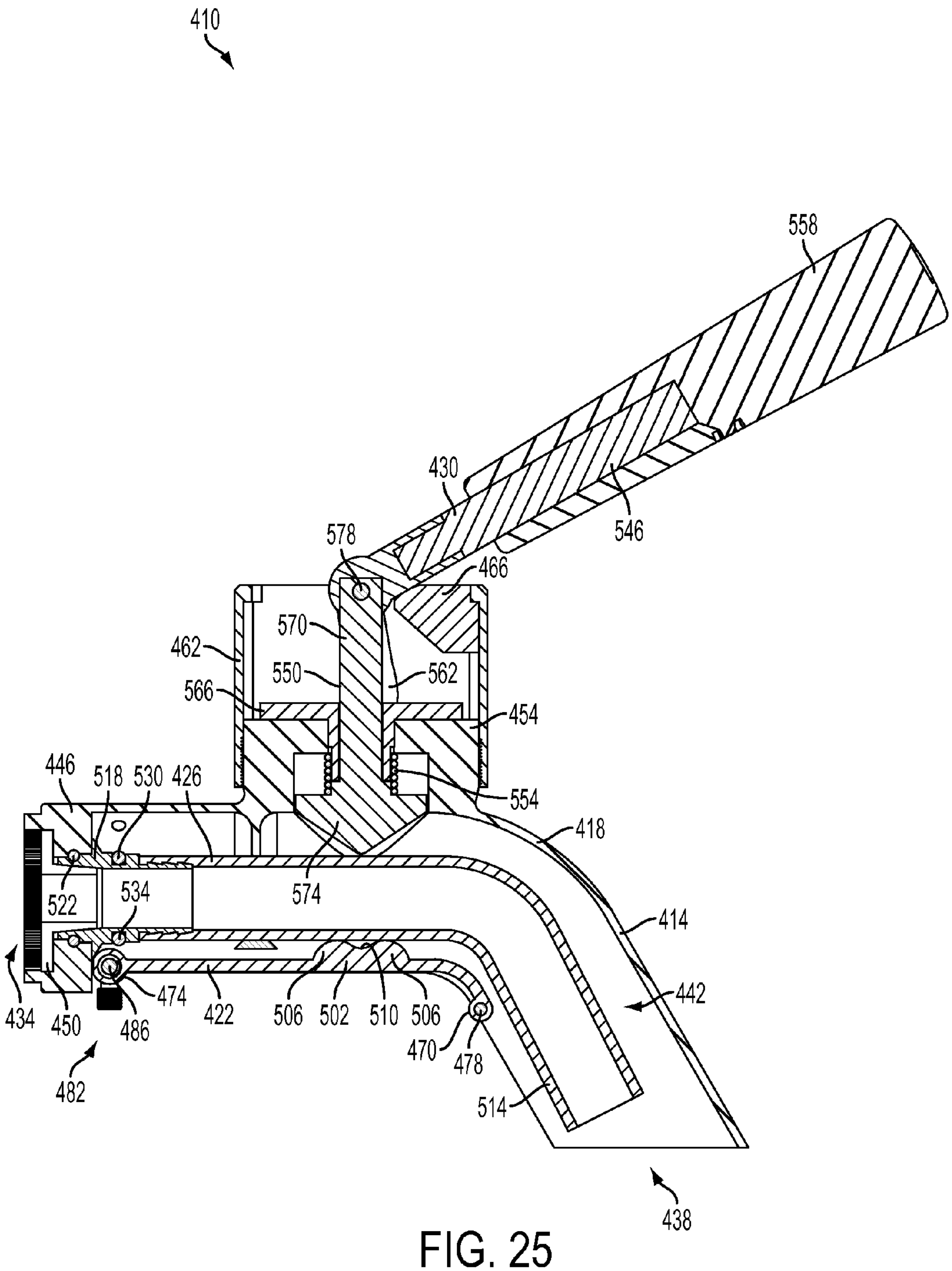
FIG. 25 is a cross-sectional view of the faucet assembly of FIG. 22 with the actuator in an open or dispensing position.

As shown in FIGS. 23-25, the actuator 430 is coupled to the mount portion 454 of the body 418 to selectively control fluid flow through the insert 426. The illustrated actuator 430 includes a handle 546, a valve member 550, and a biasing member 554. The handle 546 includes a grip 558 and a cam 562. The grip 558 is configured to be grasped by a user to actuate the actuator 430. The cam 562 extends from the grip 558 and is positioned within the housing 414. As the handle 546 moves relative to the housing 414, the cam 562 engages a surface of the housing 414 to move the valve member 550 linearly within the housing 414. In particular, the cam 562 engages a limit disk 566 of the housing 414 that is positioned within the mount portion 454 of the body 484. The limit disk 566 provides a replaceable wear surface for the cam 562 to slide against. In the illustrated embodiment, the grip 558 and the cam 562 are separate pieces that are securely fastened together. In other embodiments, the grip 558 and the cam 562 may be integrally formed as a single piece.

The valve member 550 is movable relative to the housing 414 between a closed position (FIG. 24), in which the flexible tube 514 of the insert 426 is pinched closed, and an open or dispensing position (FIG. 25), in which fluid flow is substantially uninterrupted through the flexible tube 514 of the insert 426. In the illustrated embodiment, the valve member 550 moves linearly between the closed and open positions so that the valve member 550 moves generally perpendicular to a length of the flexible tube 514 at an area where the flexible tube 514 is pinched closed. Such an arrangement compresses the flexible tube 514 in a more controlled manner (compared to a valve member that pivots) so that the flexible tube 514 is less likely to permanently deform and so that the flexible tube 514 can more readily return to its open, uncompressed shape.

The illustrated valve member 550 includes a stem 570 and a valve head 574. The stem 570 is coupled to the handle 546 by a pin 578 located between the grip 558 and the cam 562. The pin 578 allows the handle 546 to pivot relative to the stem 570 while the stem 570 moves linearly. The valve head 574 is located at an end of the stem 570 opposite from the pin 578 and is positioned within the passageway 442 of the housing 414. The illustrated valve head 574 has a generally triangularly-shaped cross-section that is configured to selectively pinch the flexible tube 514 of the insert 426 closed. The valve head 574 is contoured to generally match the contours of the lobes 506 and recess 510 of the projection 502 on the cover 422 so that the flexible tube 514 is pinched tightly closed between the valve head 574 and the projection 502.

The biasing member 554 is coupled to the valve member 550 to bias the valve member 550 to the closed position (FIG. 24). In the illustrated embodiment, the biasing member 554 is a coil spring positioned between an upper surface of the valve head 574 and an inner surface of the housing 414. In other embodiments, other suitable biasing members may also or alternatively be employed.

In operation, the handle 546 is pivotable relative to the housing 414 to move the valve member 550 linearly relative to the flexible tube 514. The handle 546 is not fixed to the housing 414 for pivoting movement about a single axis. Instead, the handle 546 is supported by the positioning block 466 in the mount portion 454 such that the handle 546 moves through a small arc when actuated by a user. The positioning block 466 guides the handle 546 to inhibit the handle 546 from spinning or turning during actuation.

As the handle 546 is pivoted to open the flexible tube 514 (i.e., from the position shown in FIG. 24 to the position shown in FIG. 25), the cam 562 pushes against the limit disk 566 to pull or lift the valve member 550 away from the flexible tube 514 (upward in FIGS. 24 and 25). The handle 546 thereby moves the valve member 550 against the bias of the biasing member 554 so that fluid flow is substantially uninterrupted through the insert 426. As the handle 546 is pivoted to close the flexible tube 514 (i.e., from the position shown in FIG. 25 to the position shown in FIG. 24), the cam 562 slides along the limit disk 566 to generally lay flat on the disk 566. The biasing member 554 can then bias the valve member 550 toward the flexible tube 514 to pinch the tube 514 closed. As shown in FIG. 24, portions of the valve head 574 and the flexible tube 514 are received in the recess 510 of the projection 502 on the cover 422 when the valve member 550 is in the closed position to help create a tight seal that inhibits fluid flow through the insert 426.

Other operations of the faucet assembly 410 (particularly, removing and replacing the insert 426) are generally the same as the faucet assemblies 10, 210, 310 discussed above The illustrated faucet assemblies 10, 210, 310, 410 are designed with similar mating geometries as existing faucets such that the faucet assemblies 10, 210, 310, 410 can be installed on beverage sources at a restaurant or bar without additional adaptors. By using replaceable inserts with the faucet assemblies 10, 210, 310, 410, the faucet assemblies 10, 210, 310, 410 can be quickly and cheaply cleaned without requiring the entire faucet assemblies 10, 210, 310, 410 to be disconnected or demounted from the beverage source. Instead, only the inserts need to be removed and replaced when the faucet assemblies 10, 210, 310, 410 are cleaned, which may be completed in as quickly as ten to fifteen seconds. Furthermore, the faucet assemblies 10, 210, 310, 410 have relatively fewer components than existing faucets, making the faucet assemblies 10, 210, 310, 410 lighter and more user-friendly than the existing faucets.

Various features and advantages of the present invention are set forth in the following claims.

What is claimed is:

1. A faucet assembly for dispensing liquid from a beverage source, the faucet assembly comprising:

a housing including a body and a cover coupled to the body, the body having an inlet end with a connector portion configured to mount to a structure associated with the beverage source and an outlet end opposite the inlet end, the cover being movable relative to the body while the body is connected to the structure to provide access to an interior of the housing;

an insert positioned within the housing in fluid communication with the beverage source to direct the liquid through the housing, the insert including a first end positioned at the inlet end of the housing and a second end adjacent the outlet end of the housing so that the insert is entirely supported by and removable from the housing, the insert being accessible through the housing when the cover is moved to provide access to the interior of the housing;

an actuator supported by the housing, the actuator movable relative to the housing to selectively inhibit fluid flow through the insert; and a coupling member extending from the cover and engaging the body to releasably secure the cover to the body, the coupling member being spaced apart from the actuator;

wherein the cover is movable between a closed position and an open position, wherein in the closed position the coupling member engages the body, and wherein in the open position the coupling member is disengaged from the body;

wherein the actuator is supported on an upper portion of the body above the insert, and wherein the cover is coupled to a lower end of the body beneath the insert.

2. The faucet assembly of claim 1, wherein the insert is removable from the housing without disconnecting the body from the structure associated with the beverage source.

3. The faucet assembly of claim 1, wherein the insert includes a flexible tube and a connector, and wherein the connector is releasably secured to the body adjacent the inlet end of the housing.

4. The faucet assembly of claim 3, wherein the actuator is operable to pinch the flexible tube closed to inhibit fluid flow through the insert.

5. The faucet assembly of claim 3, further comprising a release pin coupled to the body, wherein the release pin extends through the body and engages the connector to releasably secure the insert within the housing, and wherein the release pin is removable from the body to unsecure the insert from the body.

6. The faucet assembly of claim 5, wherein the release pin is generally U-shaped and includes a first leg and a second leg, and wherein the first leg and the second leg extend through the body and engage opposing sides of the connector to releasably secure the insert within the housing.

7. The faucet assembly of claim 3, further comprising a gasket positioned within the inlet end of the housing, wherein the connector surrounds at least a portion of the gasket.

8. The faucet assembly of claim 1, wherein the cover is pivotally coupled to the body for movement relative to the body between the open position and the closed position.

9. The faucet assembly of claim 8, wherein the coupling member is part of a manual latch mechanism to selectively secure the cover in the closed position.

10. The faucet assembly of claim 9, wherein a first end of the cover is pivotally attached to the body, and wherein the manual latch mechanism is located adjacent a second end of the cover opposite from the first end.

11. The faucet assembly of claim 9, wherein the coupling member is a first release pin, wherein the manual latch mechanism also includes a second release pin, wherein each release pin engages the body to secure the cover in the closed position, and wherein the first and second release pins are movable toward each other to disengage the first and second release pins from the body.

12. The faucet assembly of claim 11, wherein the manual latch mechanism further includes a biasing member coupled to the first and second release pins, and wherein the biasing member biases the first and second release pins away from each other.

13. The faucet assembly of claim 1, wherein the cover is removable from the body while the body is connected to the structure associated with the beverage source.

14. The faucet assembly of claim 1, wherein the actuator includes a handle and a valve member, wherein the valve member selectively pinches the insert closed to inhibit fluid flow through the insert, and wherein the handle is pivotable relative to the housing to move the valve member relative to the insert.

15. The faucet assembly of claim 14, wherein the cover includes a projection that extends generally toward the actuator, and wherein the valve member is movable toward the projection to pinch the insert closed between the valve member and the projection.

16. A faucet assembly for dispensing liquid from a beverage source, the faucet assembly comprising:

a housing including a body and a cover coupled to the body, the body having an inlet end with a connector portion configured to mount to a structure associated with the beverage source and an outlet end opposite the inlet end, the cover being movable relative to the body while the body is connected to the structure to provide access to an interior of the housing;

an insert positioned within the housing in fluid communication with the beverage source to direct the liquid through the housing, the insert including a first end positioned at the inlet end of the housing and a second end adjacent the outlet end of the housing so that the insert is entirely supported by and removable from the housing, the insert being accessible through the housing when the cover is moved to provide access to the interior of the housing; and an actuator supported by the housing, the actuator including a handle pivotally coupled to the housing, the handle including a cam, a valve member positioned within the housing and coupled to the handle for movement with the handle, the valve member movable linearly relative to the housing between a first position, in which fluid flow is substantially uninterrupted through the flexible tube, and a second position, in which the flexible tube is pinched close, and a biasing member coupled to the valve member to bias the valve member toward the second position, wherein the cam engages a surface of the housing as the handle is pivoted so that the handle pulls the valve member away from the flexible tube against a bias of the biasing member; and a coupling member extending from the cover and engaging the body to releasably secure the cover to the body, the coupling member being spaced apart from the actuator;

wherein the cover is movable between a closed position and an open position, wherein in the closed position the coupling member engages the body, and wherein in the open position the coupling member is disengaged from the body;

wherein the actuator is supported on an upper portion of the body above the insert, and wherein the cover is coupled to a lower end of the body beneath the insert.

17. The faucet assembly of claim 1, wherein the cover is vertically aligned with the actuator so that the actuator pinches the insert closed against the cover.

18. The faucet assembly of claim 16, wherein the cover is vertically aligned with the actuator so that the valve member pinches the insert closed against the cover.

19. A faucet assembly for dispensing liquid from a beverage source, the faucet assembly comprising:

a housing including a body and a cover coupled to the body, the body having an inlet end with a connector portion configured to mount to a structure associated with the beverage source and an outlet end opposite the inlet end, the cover being movable relative to the body while the body is connected to the structure to provide access to an interior of the housing;

an insert positioned within the housing in fluid communication with the beverage source to direct the liquid through the housing, the insert including a first end positioned at the inlet end of the housing and a second end adjacent the outlet end of the housing so that the insert is entirely supported by and removable from the housing, the insert being accessible through the housing when the cover is moved to provide access to the interior of the housing;

an actuator supported by the housing, the actuator movable relative to the housing to selectively inhibit fluid flow through the insert;

a coupling member extending from the cover and engaging the body to releasably secure the cover to the body, the coupling member being spaced apart from the actuator;

wherein the cover is movable between a closed position and an open position, wherein in the closed position the coupling member engages the body, and wherein in the open position the coupling member is disengaged from the body;

wherein the insert includes a flexible tube and a connector, and wherein the connector is releasably secured to the body adjacent the inlet end of the housing; and a release pin coupled to the body, wherein the release pin extends through the body and engages the connector to releasably secure the insert within the housing, and wherein the release pin is removable from the body to unsecure the insert from the body.

* * * * *